(12) United States Patent
Ueda

(10) Patent No.: US 7,551,365 B2
(45) Date of Patent: Jun. 23, 2009

(54) ZOOM LENS, DIGITAL CAMERA AND PORTABLE INFORMATION DEVICE

(75) Inventor: Minoru Ueda, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 81 days.

(21) Appl. No.: 11/595,652

(22) Filed: Nov. 9, 2006

(65) Prior Publication Data

US 2007/0103792 A1    May 10, 2007

(30) Foreign Application Priority Data

Nov. 10, 2005  (JP) ............................. 2005-325980
Jul. 26, 2006  (JP) ............................. 2006-203313

(51) Int. Cl.
*G02B 15/14* (2006.01)
(52) U.S. Cl. ..................................... 359/686
(58) Field of Classification Search ................. 359/686
See application file for complete search history.

(56) References Cited

U.S. PATENT DOCUMENTS

| 6,088,169 A | 7/2000 | Ohno |
| 6,204,976 B1 | 3/2001 | Ngahara |
| 6,606,201 B1 * | 8/2003 | Hirose ......................... 359/686 |
| 2004/0080632 A1 * | 4/2004 | Iwasawa et al. .......... 348/240.3 |
| 2004/0223234 A1 | 11/2004 | Konno |
| 2005/0018313 A1 | 1/2005 | Kuba |

FOREIGN PATENT DOCUMENTS

| JP | 03-140911 | 6/1991 |
| JP | H08-304704 | 11/1996 |
| JP | 11-249016 | 9/1999 |
| JP | 2000-275519 A | 10/2000 |
| JP | 2001-083421 A | 3/2001 |
| JP | 2001-124989 A | 5/2001 |
| JP | 2002-72095 | 3/2002 |
| JP | 2002-107627 A | 4/2002 |
| JP | 2003-255226 A | 9/2003 |
| JP | 2004-004533 A | 1/2004 |
| JP | 3493406 | 2/2004 |
| JP | 2004-333721 A | 11/2004 |
| JP | 2004-348082 A | 12/2004 |
| JP | 2005-157097 A | 6/2005 |

* cited by examiner

*Primary Examiner*—William C Choi
(74) *Attorney, Agent, or Firm*—Edwards Angell Palmer & Dodge LLP; David G. Conlin; David A. Tucker

(57) ABSTRACT

A zoom lens in the present invention is composed of a first lens group G1 having a fixed distance from the image plane side and negative refracting power, a second lens group G2 having positive refracting power and moving during zooming, a third lens group G3 having positive refracting power and moving during zooming, and a fourth lens group G4 having a fixed distance from the image plane side and positive refracting power. The first, the second, the third and the fourth lens groups G1-G4 are arranged in order from the object side to the image plane side. The third lens group G3 includes an aperture stop s, a lens 13 having positive refracting power and a lens 14 having negative refracting power, being arranged in order from the object side to the image plane side. The zoom lens is high performance and large in zoom ratio and is compact due to the simple structure.

14 Claims, 16 Drawing Sheets

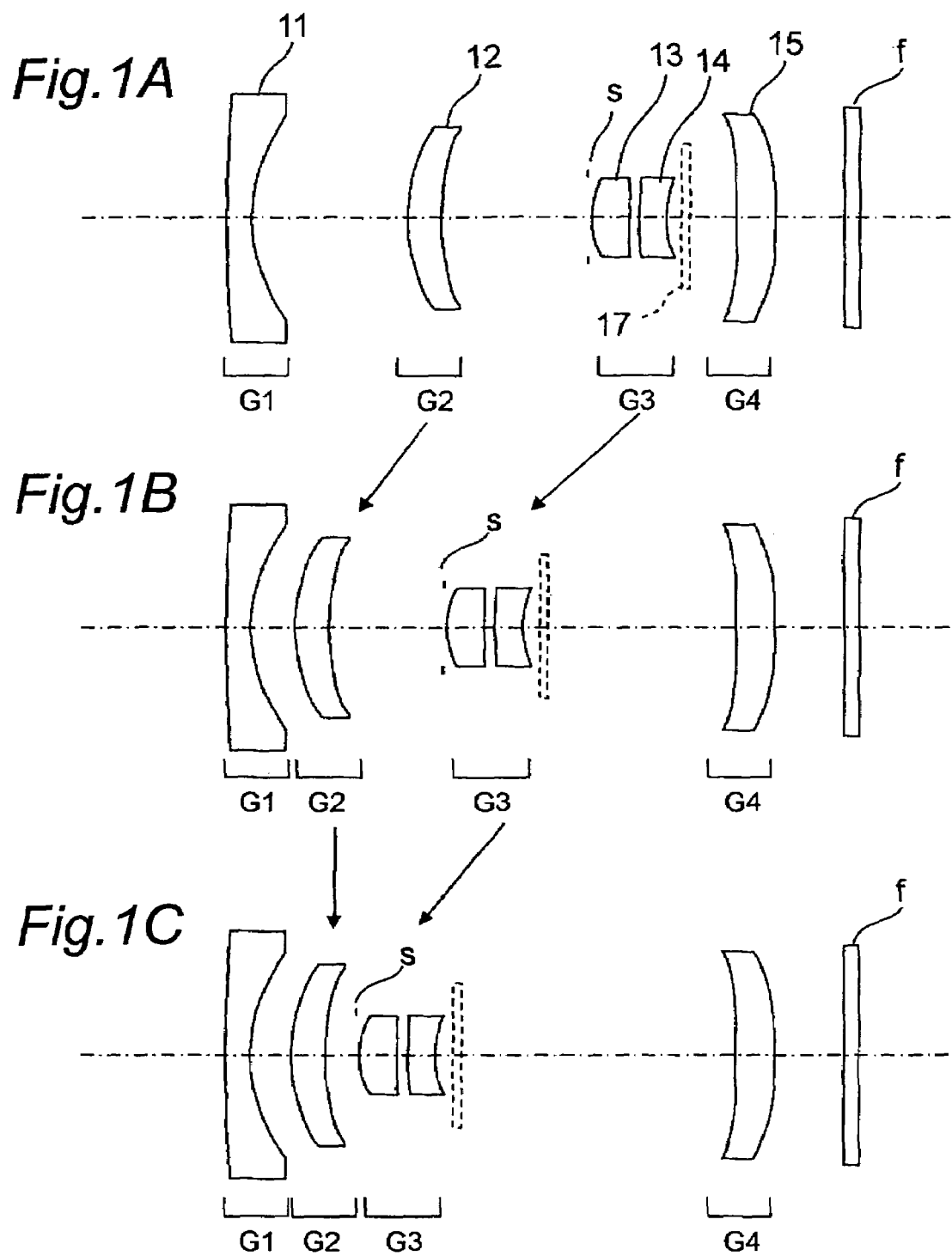

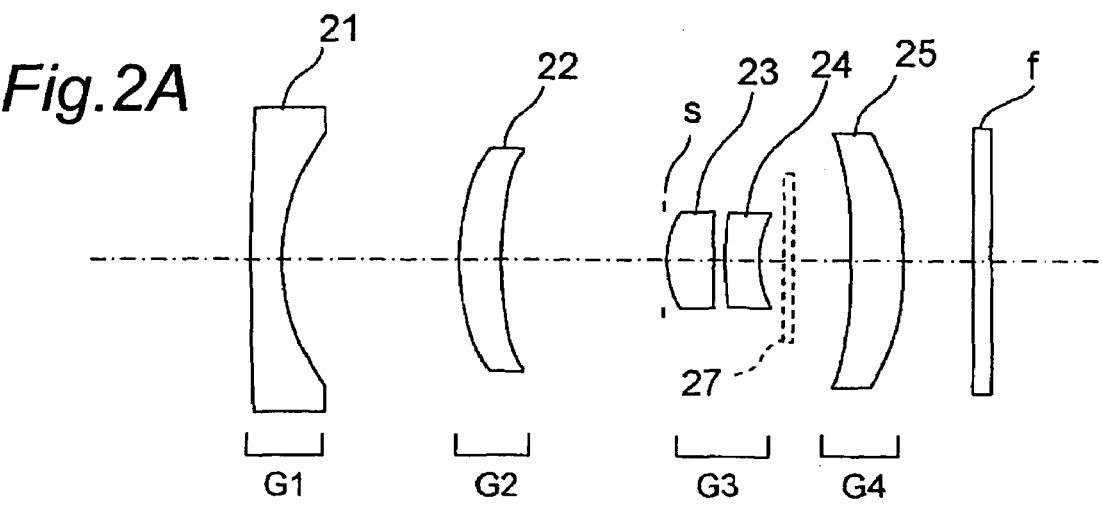
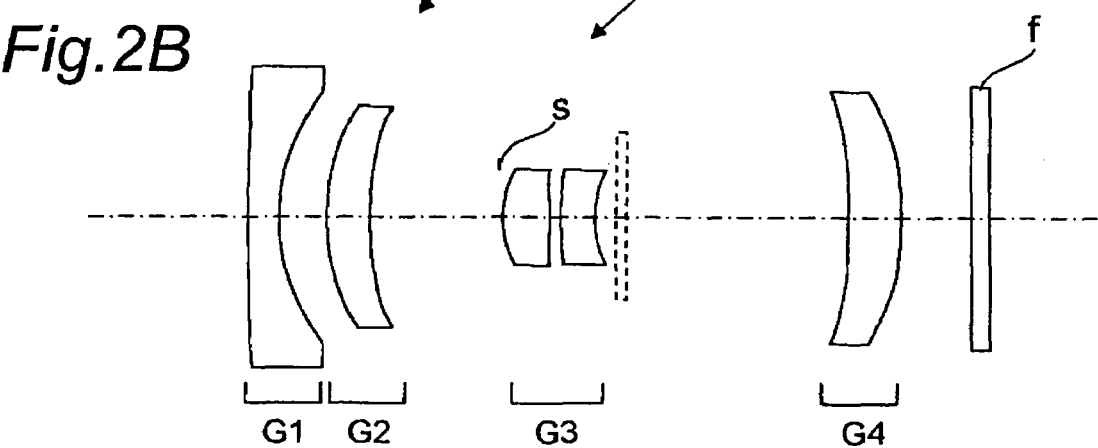
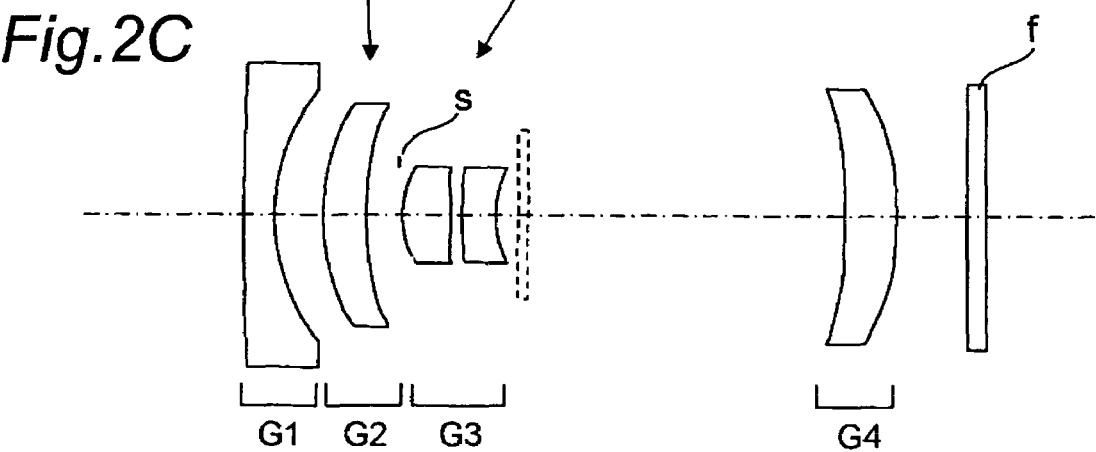

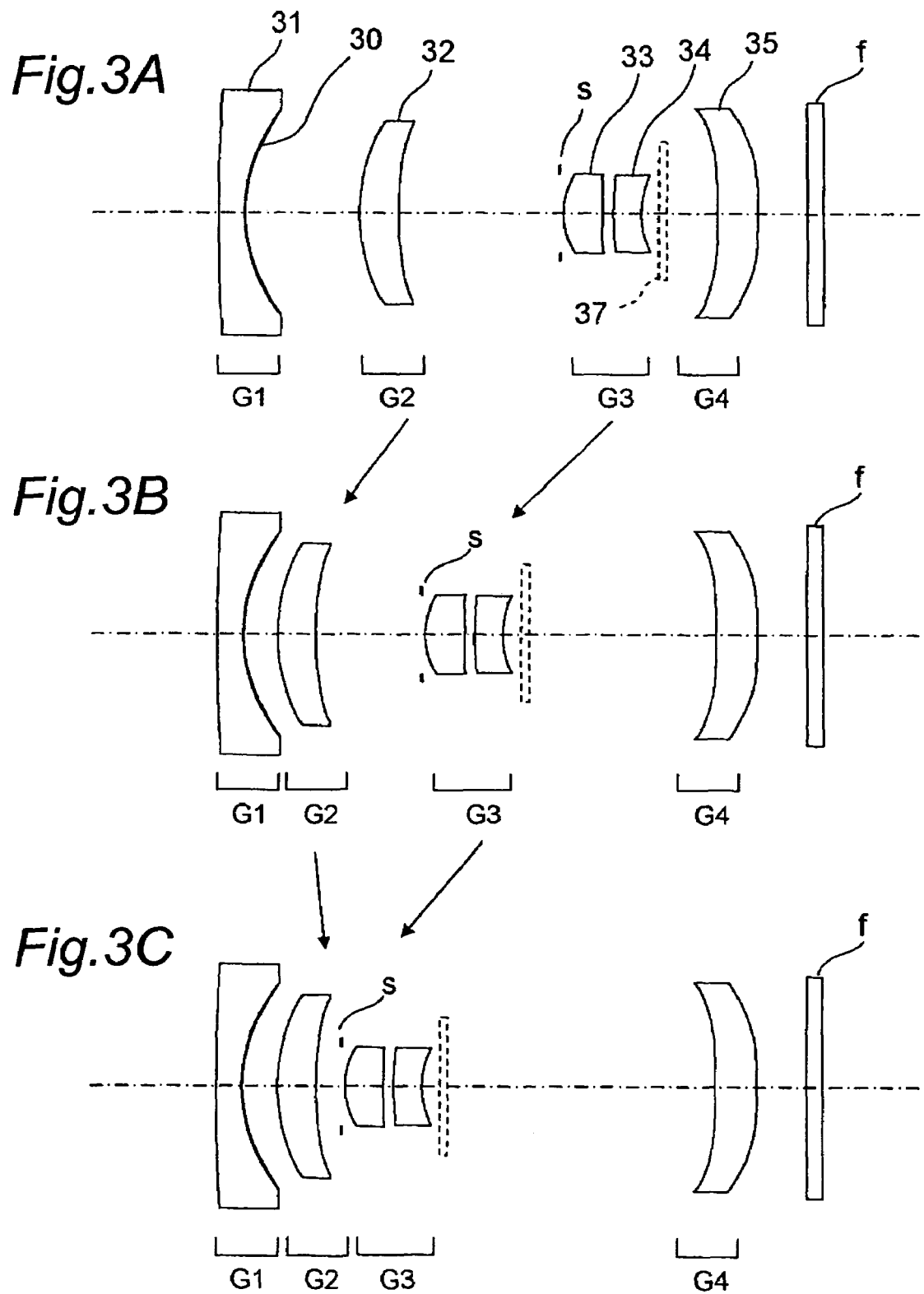

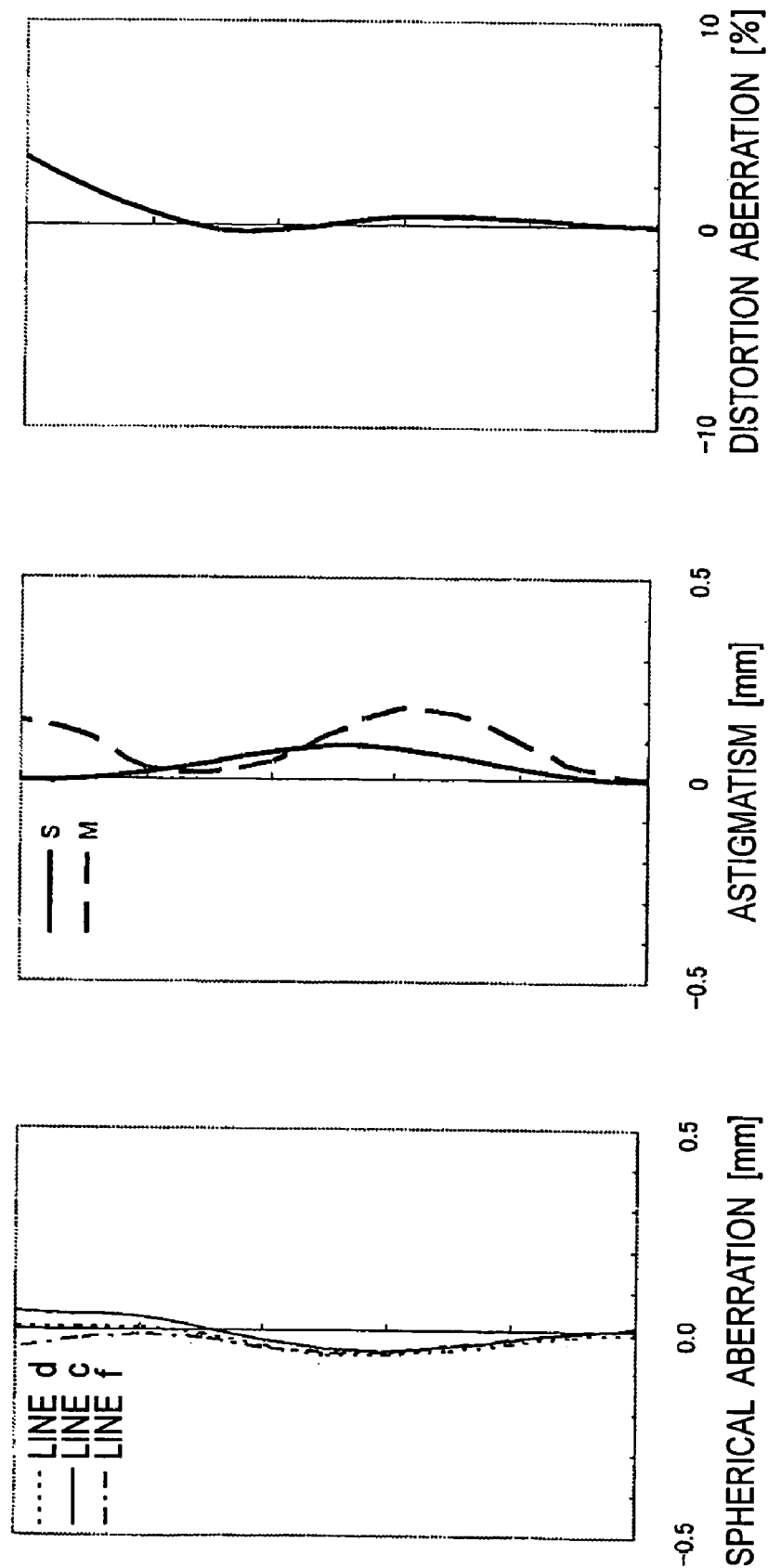

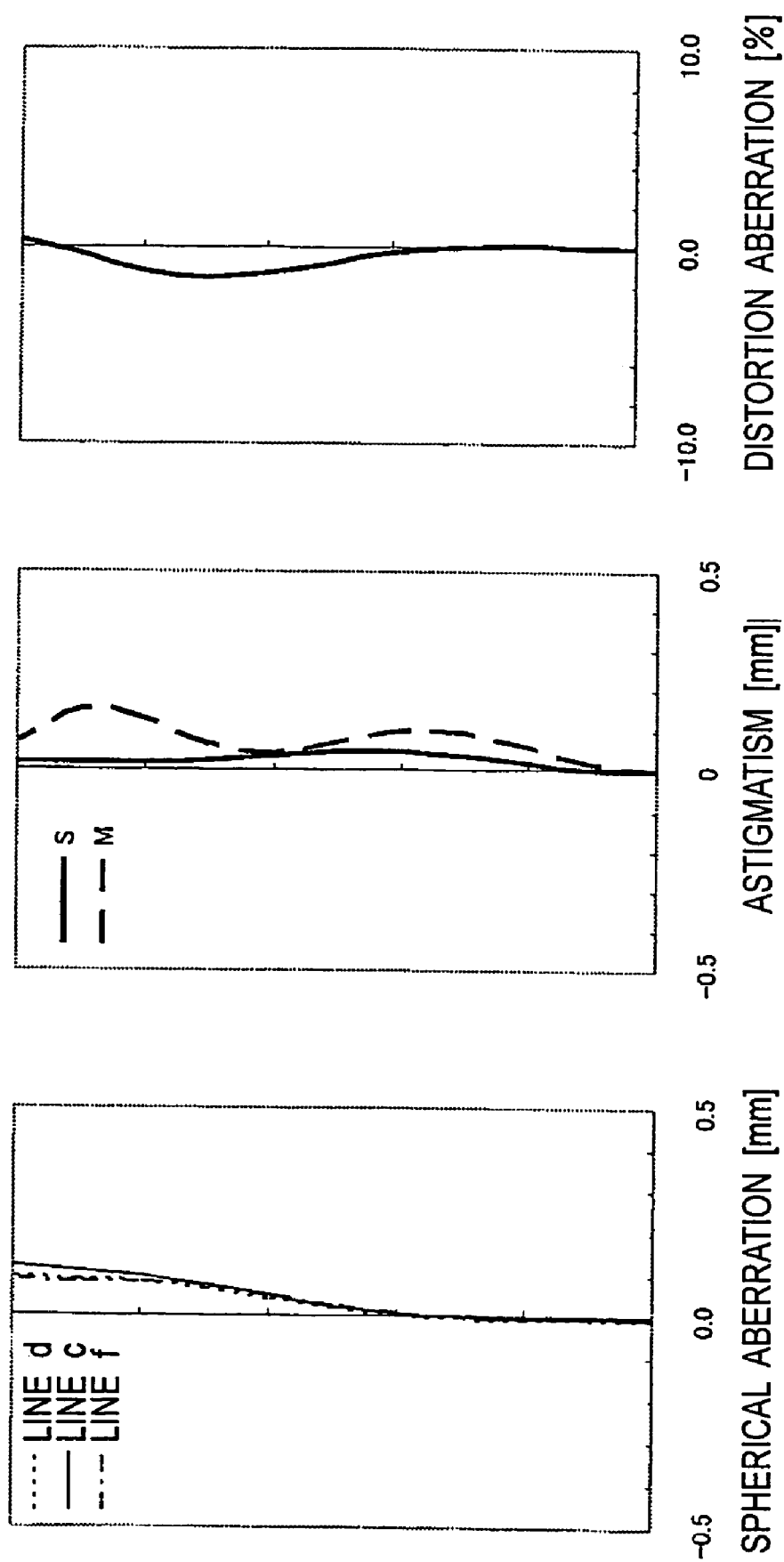

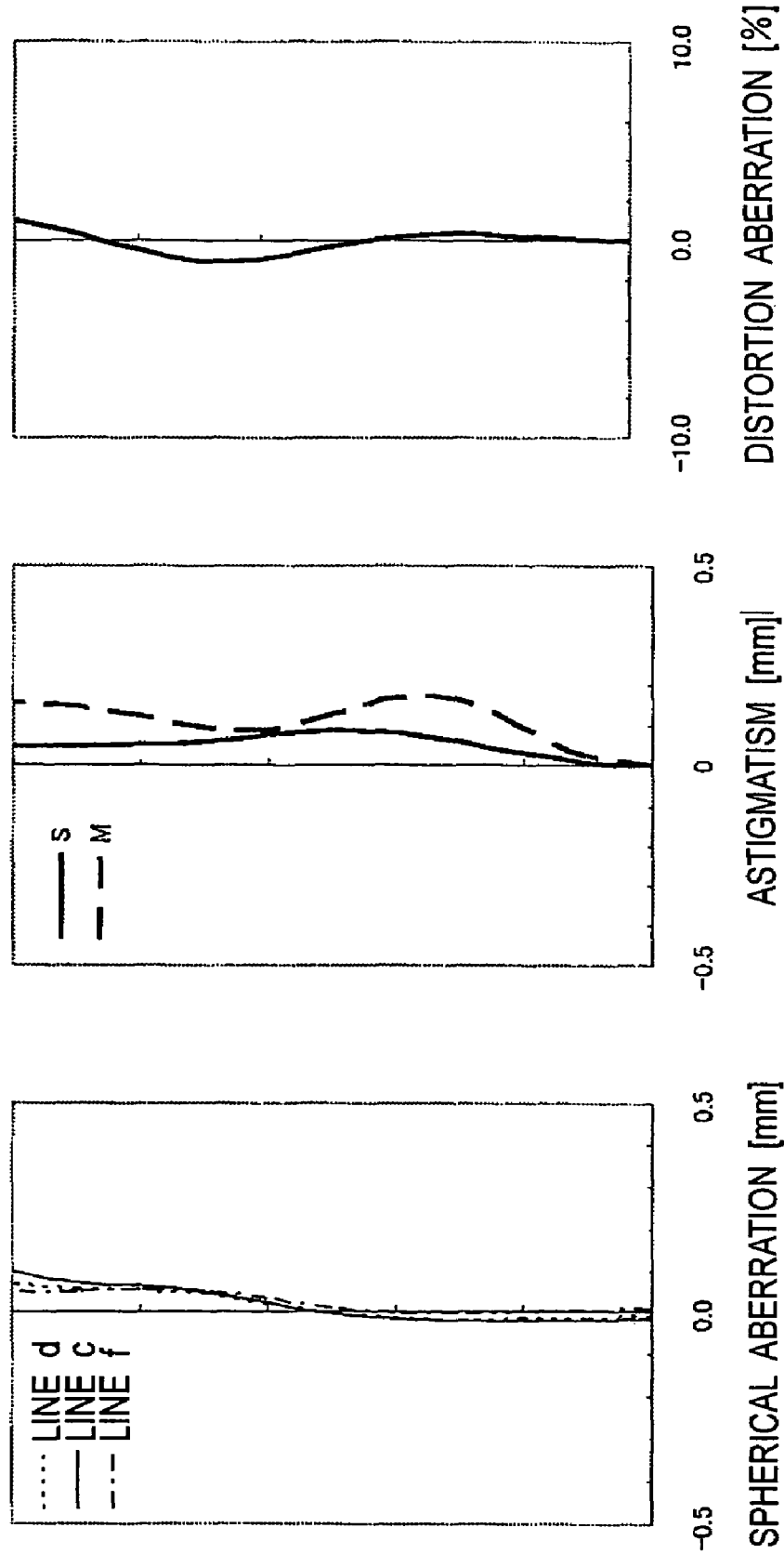

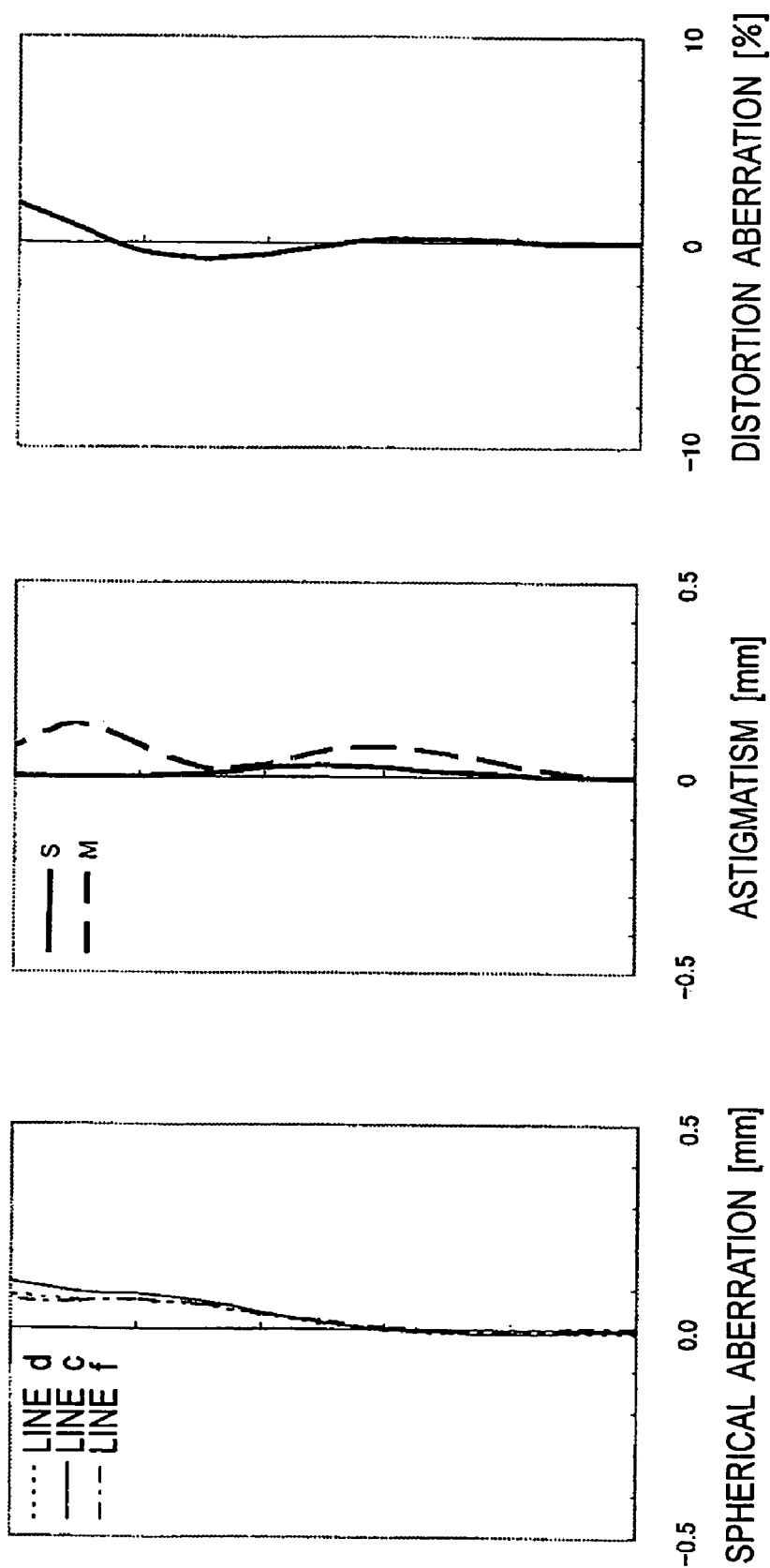

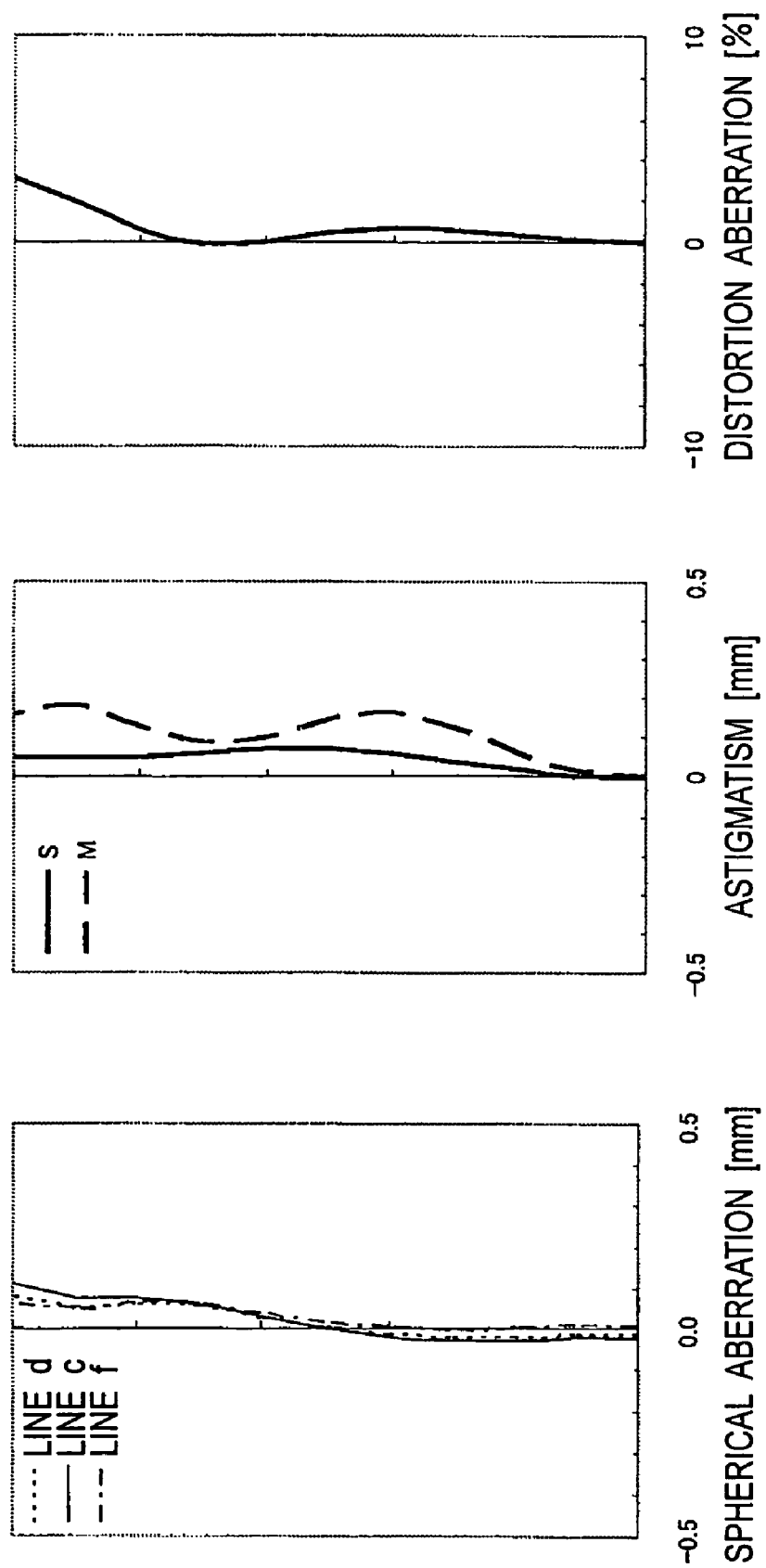

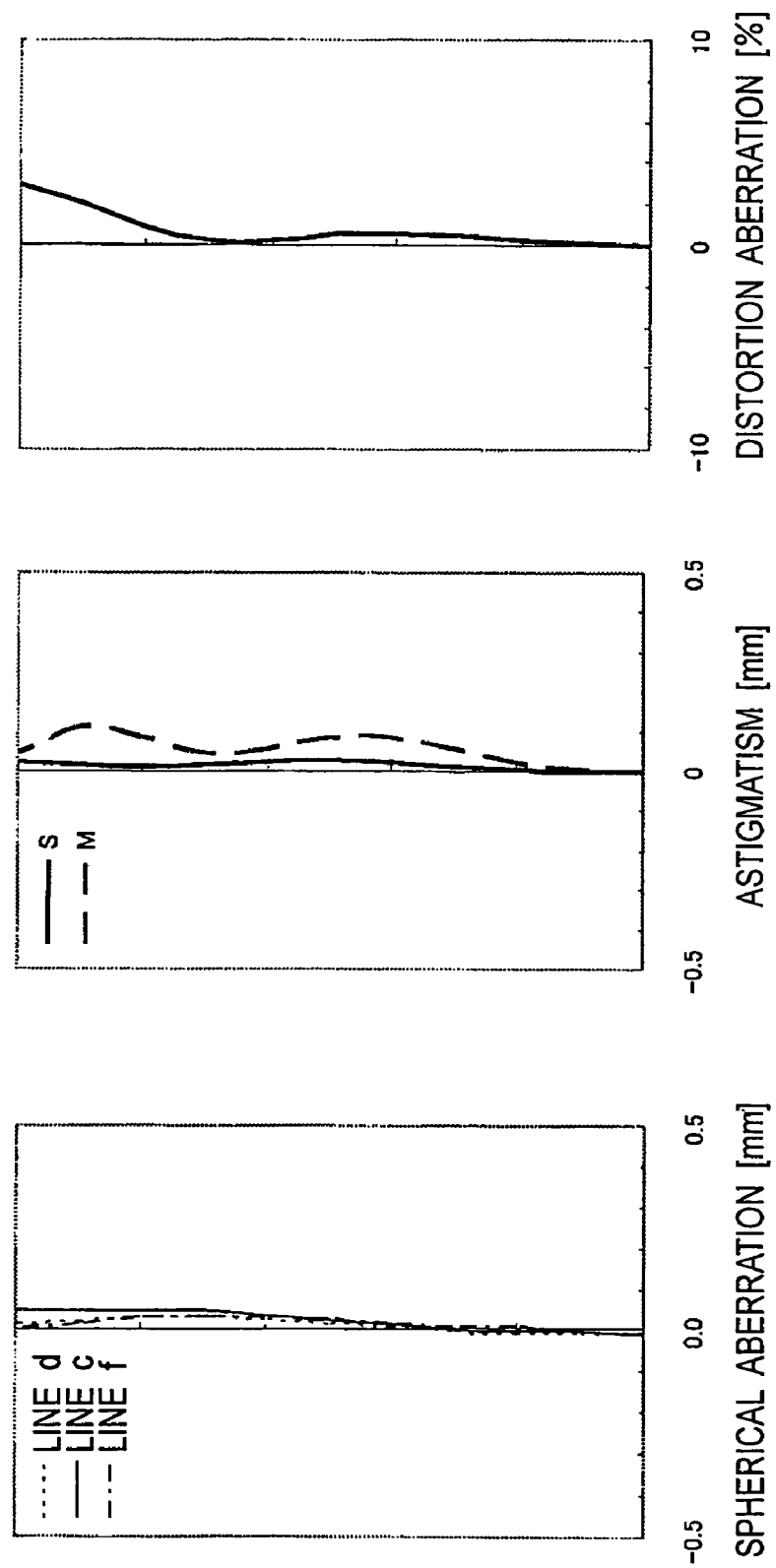

ZOOM LENS, DIGITAL CAMERA AND PORTABLE INFORMATION DEVICE

CROSS-REFERENCE TO RELATED APPLICATIONS

This nonprovisional application claims priority under 35 U.S.C. §119(a) on patent application Ser. No(s). 2005-325980 filed in Japan on Nov. 10, 2005 and 2006-203313 filed in Japan on Jul. 26, 2006, the entire contents of which are hereby incorporated by reference.

BACKGROUND OF THE INVENTION

The present invention relates to a small-size zoom lens, and more particularly to a zoom lens which is incorporated in handheld terminals and mobile phones and which has excellent portability by reduction of the overall length of the lens as well as to a digital camera and a portable information device using the same.

In recent years, handheld terminals called PDAs (Personal Digital Assistances), mobile phones and the like widely prevail, and most of them carry imaging devices such as digital cameras. These imaging devices use small-size CCDs (Charge Coupled Devices) and CMOS (Complementary Metal-Oxide Semiconductor) sensors to achieve downsizing. As these devices prevail, the imaging devices are required to be smaller as well as to achieve high definition and high performance, as a result of which zoom lenses are being mounted on thin casings such as mobile phones.

In such zoom lenses mounted on portable terminals such as mobile phones, a conventional zoom lens, in which a lens closest to the object side is driven, is not preferred in terms of dust control and impact resistance, but a zoom lens, which is structured so that only inner lenses of the zoom lens are driven while lenses closest to the object side and on the side of an image plane are fixed, has advantages for portable devices due to its sufficient robustness and easiness in dust control.

As such a zoom lens, for example, JP H11-249016 discloses a zoom lens composed of four negative, positive, positive, and positive components, the zoom lens having, in order from the object side, a first lens group having a negative refracting power, and a second lens group, a third lens group and a fourth lens group each having positive refracting power, in which only the second lens group and the third lens group are driven to perform variable magnification. In the zoom lens, an aperture stop is provided in between the first lens group and the second lens group, and lenses are glued together to form the fourth lens group, so that the zoom lens which is compact and smaller in number of lenses is achieved.

As an optical system of the same type, JP 3493406 discloses a zoom lens in which all the lens groups are structured from one lens by heavy use of aspherical surfaces.

However, in the structure disclosed in JP H11-249016, the fourth lens group, which is structured from two lenses, is close to the image plane so that its external diameter is large and its radius of curvature is small, which disables the thickness of the lenses from being reduced. Therefore, the fourth lens group structured from two lenses causes extreme increase in the overall length of the optical system. Moreover, as disclosed in JP 3493406, the respective lens groups structured from one lens make it difficult to correct chromatic aberration.

SUMMARY OF THE INVENTION

An object of the present invention is to provide, in view of these problems, a zoom lens which is compact, large in zoom ratio and is high performance with a simple structure, as well as a digital camera and a portable information device using the same.

In order to achieve the above object, there is provided a zoom lens, comprising:

a first lens group which has a fixed distance from an image plane and which has negative refracting power;

a second lens group which has positive refracting power and which moves at a time of zooming;

a third lens group which has positive refracting power and which moves at a time of zooming; and a fourth lens group which has a fixed distance from the image plane and which has positive refracting power;

wherein the first lens group, the second lens group, the third lens group and the fourth lens group are arranged in order from an object side to an image plane side, and wherein the third lens group has an aperture stop and a plurality of lenses.

According to the zoom lens having the above structure, the negative, positive, positive and positive-type zoom lens, which is excellent in robustness and dust control and which has the first lens group and the fourth lens group being fixed, makes it possible to minimize the increase in the overall length of the zoom lens while sufficiently correcting chromatic aberration. Therefore, the zoom lens which is compact, large in zoom ratio and is high performance can be achieved with simple structure. It is to be noted that the term "lens group" may refer not only to a group of plurality of lenses but also to a single lens.

In one embodiment, a plurality of the lenses in the third lens group include at least one lens having positive refracting power and at least one lens having negative refracting power.

According to the zoom lens in this embodiment, the third lens group having the largest moving distance is constituted by combining a lens having positive refracting power and a lens having negative refracting power, so that chromatic aberration can sufficiently be corrected.

In one embodiment, in the third lens group, the lens having the aperture stop and the positive refracting power and the lens having the refracting power are arranged in order from the object side to the image plane side.

According to the zoom lens in this embodiment, an aperture stop, a lens having positive refracting power and a lens having the negative refracting power are arranged in order from the object side to the image plane side, so that the effective diameter of the lens having positive refracting power and the lens having negative refracting power can be set at the same level as the effective diameter of the aperture stop.

In one embodiment, at a time of zooming from a wide-angle end to a telephoto end, an interval between the first lens group and the second lens group decreases monotonously, while an interval between the third lens group and the fourth lens group increases monotonously.

According to the zoom lens in this embodiment, the more the third lens group, that is a main image forming group, is forwarded to the object side, the longer the focal length becomes. Consequently, during zooming from a wide-angle end to a telephoto end, a larger moving distance of the third lens group can generally increase magnifying power. Accordingly, as the third lens group moves to the object side during zooming, the second lens group is also moved to the object side, so that the movable range of the third lens group can be secured and high magnifying power can be achieved.

In one embodiment, at a time of zooming from a wide-angle end to a telephoto end, an interval between the third lens group and the fourth lens group increases, and wherein at a time of zooming from a position at which an interval between the first lens group and the second lens group is minimized to a telephoto end, an amount of change in the interval between the first lens group and the second lens group is $1/10$ or less of a maximum travel amount of the second lens group.

According to the zoom lens in this embodiment, during zooming from a zoom position, at which a distance between the first lens group and the second lens group is minimized, to a telephoto end, the amount of change in the interval between the first lens group and the second lens group is set at $1/10$ or less of the maximum moving amount of the second lens group in order to secure the movable range of the third lens group. This makes it possible to obtain sufficient magnifying power.

In one embodiment, the zoom lens further comprises a mechanical shutter placed in between the third lens group and the fourth lens group in a vicinity of the third lens group.

According to the zoom lens in this embodiment, a mechanical shutter is placed in between the third lens group and the fourth lens group in the vicinity of the third lens group. Since the mechanical shutter is close to the aperture stop, the aperture size of the mechanical shutter can be reduced, which is advantageous for downsizing. Different from the case where the mechanical shutter is provided in the vicinity of the image plane, the shutter can be released at a position where luminous flux is gathered, and therefore it becomes possible to suppress reduction in peripheral light amount due to shutter speed.

In one embodiment, the first lens group is structured from only one lens.

According to the zoom lens in this embodiment, structuring the first lens group with a large effective diameter from one lens makes it possible to minimize the increase in overall length of the zoom lens caused by the thickness of the lenses.

In one embodiment, the first lens group is a meniscus lens having a convex surface on the object side.

According to the zoom lens in this embodiment, using a meniscus lens having a convex surface on the object side as the first lens group makes it possible to keep a peripheral light amount rate high also at the wide-angle end.

In one embodiment, a concave surface of the meniscus lens on the image plane side is aspheric.

According to the zoom lens in this embodiment, forming the surface of the meniscus lens of the first lens group aspherical makes it possible to achieve sufficient aberration correction of off-axis light beams and to structure the first lens group from one lens, which are advantageous for downsizing.

In one embodiment, in the first lens group, the concave surface of the meniscus lens on the image plane side is formed to be aspherical with resin.

According to the zoom lens in this embodiment, forming the surface of the meniscus lens of the first lens group on the image plane side aspherical with resin makes it possible to achieve sufficient aberration correction of off-axis light beams and to structure the first lens group from one lens, which are advantageous for downsizing.

In one embodiment, there is provided a digital camera, comprising the above zoom lens, and an electronic imaging device for receiving images formed by the zoom lens.

According to the digital camera having the above structure, using the zoom lens makes it possible to achieve the digital camera which is small size, large in zoom ratio and high performance.

In one embodiment, there is provided a portable information device, comprising the above zoom lens, and an electronic imaging device for receiving images formed by the zoom lens.

According to the portable information device having the above structure, using the zoom lens makes it possible to achieve the portable information device which has a small size, a large zoom ratio and high-performance photographing functions.

As is clear from the above description, according to the zoom lens of the present invention, which is excellent in robustness and dust control and which has the first lens group and the fourth lens group being fixed, an aperture stop is provided in the third lens group which is movable for zooming (variable magnification), and the third lens group is structured from a lens having positive refracting power and a lens having negative refracting power, by which the increase in the overall length of the zoom lens caused by the increase in the number of lenses can be minimized, and thereby it becomes possible to provide the zoom lens which is compact and sufficient in correction of chromatic aberration.

According to the digital camera of the present invention, using the zoom lens makes it possible to achieve the digital camera which is small size, large in zoom ratio and is high performance.

According to the portable information device, using the zoom lens makes it possible to achieve the portable information device which has a small size, a large zoom ratio and high-performance photographing functions.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIGS. 1A to 1C are cross sectional views showing the structure of a zoom lens in a first embodiment of the present invention:

FIGS. 2A to 2C are cross sectional views showing the structure of a zoom lens in a second embodiment of the present invention:

FIGS. 3A to 3C are cross sectional views showing the structure of a zoom lens in a third embodiment of the present invention:

FIG. 5C is a view showing the aberration at a telephoto end of the zoom lens;

FIG. 6B is a view showing the aberration at an intermediate of the zoom lens;

FIG. 6C is a view showing the aberration at a telephoto end of the zoom lens;

FIG. 7B is a view showing the aberration at an intermediate of the zoom lens;

FIG. 7C is a view showing the aberration at a telephoto end of the zoom lens;

FIG. 8C is a view showing the aberration at a telephoto end of the zoom lens.

DETAILED DESCRIPTION OF THE INVENTION

Figure 4A:
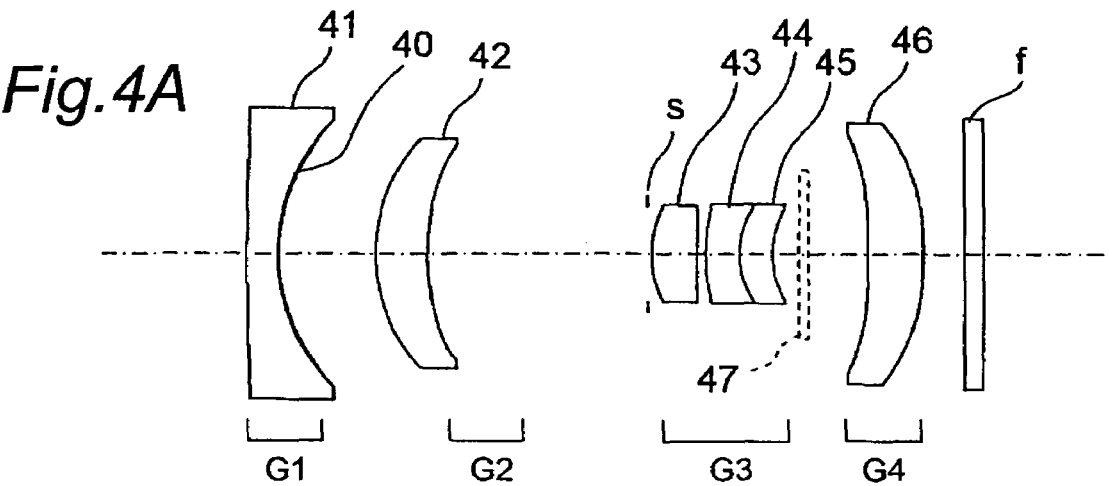
FIGS. 4A to 4C are cross sectional views showing the structure of a zoom lens in a fourth embodiment of the present invention.

Hereinbelow, a zoom lens, a digital camera and a portable information device of the present invention will be described in detail in conjunction with the preferred embodiments with reference to the accompanying drawings. It is to be understood that the present invention is not limited to the embodiments disclosed below.

First Embodiment

FIG. 1 is a cross sectional view showing the structure of a zoom lens in the first embodiment of the present invention, in which FIG. 1A shows the zoom position at a wide-angle end in cross section, FIG. 1B shows the zoom position at an intermediate focal length in cross section and FIG. 1C shows the zoom position at a telephoto end in cross section. In FIG. 1, the left hand-side is an object side, while the right-hand side is an image plane side. Arrow lines in the drawing show the movement of lenses during zooming.

The zoom lens in the first embodiment is composed of, as shown in FIG. 1, a first lens group G1 having negative refracting power, a second lens group G2 having positive refracting power, a third lens group G3 having positive refracting power and a fourth lens group G4 having positive refracting power, the first lens group G1, the second lens group G2, the third lens group G3 and the fourth lens group G4 being arranged in order from the object side to the image plane side. The zoom lens is of type in which the first lens group G1 and the fourth lens group G4 are fixed during variable magnification and focusing (achieving focus) operations, while the second lens group G2 and the third lens group G3 move along an optical axis for performing variable magnification and focusing.

The first lens group G1 is a meniscus lens 11 with its convex surface facing the object side, and the second lens group G2 is a lens 12 having positive refracting power with its convex surface facing the object side while its concave surface facing the image plane side. The third lens group G3 includes an aperture stop s, a lens 13 having positive refracting power on the object side and a lens 14 having negative refracting power on the image plane side, the aperture stop s, the lens 13 and the lens 14 being arranged in order from the object side to the image plane side. The fourth lens group G4 is a lens 15 having positive refracting power with its concave surface facing the object side while its convex surface facing the image plane side. A glass block f such as filters is placed on the image plane side of the fourth lens group G4.

The aperture stop s and the lenses 13, 14 in the third lens group G3 move integrally.

In the above zoom lens structure, fixing the first lens group G1 and the fourth lens group G4 makes it easy to enhance sealability of the zoom lens and to achieve excellent dust control and sufficient robustness. Moreover, minus lead-type zoom lenses in which a lens having negative refracting power is placed on the object side generally have the first lens group with a large effective diameter, and therefore excluding the first lens group from driving is effective in terms of mechanism structure.

Generally, it is effective for correction of chromatic aberration of the lens to combine lenses having positive refracting power and lenses having negative refracting power made of a plurality of different materials. However, increasing the number of lenses leads to increase in the overall length of the zoom lens and thereby makes downsizing difficult. Therefore, it is most effective for correction of chromatic aberration to structure the group, which can minimize the increase in the overall length of the zoom lens caused by the increase in the number of lenses, from a plurality of lenses.

Moreover, the lens is required to have a thickness of about 0.5 mm to 1.0 mm even in its thinnest section in consideration of strength and the like. A biconcave lens is required to have a central thickness larger than this thickness range, whereas a biconvex lens is required to have an outermost section thicker than this thickness range. Accordingly, among lenses having an identical radius of curvature, those lenses having larger effective diameters need to have larger lens thicknesses. Therefore, by using a plurality of lenses different in glass material so as to constitute the lens groups having smaller effective diameters, it becomes possible to minimize the increase in the overall length of the zoom lens while correcting chromatic aberration.

Therefore, the third lens group G3 having an aperture stop s is structured from a lens having positive refracting power and a lens having negative lens made of a plurality of different materials, so that it becomes possible to minimize the increase in the overall length of the zoom lens while correcting chromatic aberration.

Moreover, by placing the third lens group G3 so that the aperture stop s, the lens having positive refracting power and the lens having negative refracting power are arranged in order from the object side to the image plane side, the effective diameter of the lens having positive refracting power and the lens having negative refracting power may be set at the same level as the effective diameter of the aperture stop s. Reducing the effective diameter of the aperture stop s makes it possible to reduce the effective diameter of the lenses in the third lens group G3.

It is to be noted that if the third lens group G3 is placed so that the aperture stop s, the lens having negative refracting power and the lens having positive refracting power are arranged in order from the object side, the effective diameter of the lenses having positive refracting power increases.

In the lens in the first embodiment, at the time of zooming from a wide-angle end to a telephoto end, the interval between the third lens group G3 and the fourth lens group G4 increases monotonously, while the interval between the first lens group G1 and the second lens group G2 decreases monotonously. In the zoom lens in the present invention, since the third lens group G3 is a main image forming group, the more the third lens group G3 is forwarded to the object side, the longer the focal length becomes. Consequently, when the lens zooms from a wide-angle end to a telephoto end, a larger moving distance of the third lens group G3 can generally increase magnifying power. Accordingly, as the third lens group G3 moves to the object side during zooming, the second lens group G2 is also moved to the object side, so that the movable range of the third lens group G3 can be secured and high magnifying power can be achieved.

In the zoom lens having the above structure, a shortest distance between the third lens group G3 and the fourth lens group G4 is 2 mm or more, that is a relatively large distance, so that a mechanical shutter 17 can be provided in this space. In this case, if a shutter is placed in between the third lens group G3 and the fourth lens group G4 in the vicinity of the third lens group G3 so that the shutter move integrally with the third lens group G3, it becomes possible to reduce the aperture diameter of the shutter because the shutter is close to the aperture stop s, which is advantageous for downsizing. Different from the case where the shutter is provided in the vicinity of the image plane, the shutter can be released at a position where luminous flux is gathered, and therefore it becomes possible to suppress reduction in peripheral light amount due to shutter speed.

In the zoom lens in the first embodiment, by using the meniscus lens 11 with its convex surface facing the object side as the first lens group G1 having negative refracting power, it becomes possible to keep a peripheral light amount rate high also at the wide-angle end.

Moreover, forming the surface of the meniscus lens 11 of the first lens group G1 on the image plane side aspherical makes it possible to achieve sufficient aberration correction of off-axis light beams and to structure the first lens group G1 from one lens, which are advantageous for downsizing.

Moreover, using low-dispersion glass materials having high refractive index to constitute the first lens group G1 is effective for aberration correction because it becomes possible to increase the radius of curvature of the lens while it is also effective for downsizing because the thickness of the lens is decreased.

Now, Tables 1 to 3 show numerical examples of the zoom lens in the first embodiment. The numerical examples of the surface data shown in Table 1 show data on the respective surfaces in order from the object side, the data including a radius of curvature, a lens thickness or a space, a refractive index with respect to line d and an Abbe number with respect to line d. The aspherical surfaces in Tables 1 and 2 are formed into aspherical surfaces expressed by the following aspherical surface equation.

$$Z = \frac{\frac{Y^2}{R}}{1 + \sqrt{1 - (1+K)\frac{Y^2}{R^2}}} + AY^4 + BY^6 + CY^8 + DY^{10} \quad \text{(equation 1)}$$

wherein K represents a cone constant, A, B, C and D represent aspherical coefficients, Y represents a height from an optical axis, R represents a radius of curvature at an aspherical apex, and Z represents a distance between a tangential plane of the aspherical apex and a point on the aspherical surface at the height Y from the optical axis measured perpendicular to the tangential plane.

TABLE 1

| Surface | | Radius of curvature | Axial spacing | Refractive index | Abbe number |
|---|---|---|---|---|---|
| 1 | | 57.991 | 0.800 | 1.806 | 40.7 |
| 2 | Aspheric | 5.197 | Variable | | |
| 3 | Aspheric | 5.426 | 1.111 | 1.821 | 24.1 |
| 4 | Aspheric | 8.622 | Variable | | |
| 5 | Stop | ∞ | 0.100 | | |
| 6 | Aspheric | 2.847 | 1.234 | 1.589 | 61.3 |
| 7 | Aspheric | −14.705 | 0.325 | | |
| 8 | | 15.596 | 0.900 | 1.847 | 23.8 |
| 9 | | 3.377 | Variable | | |
| 10 | Aspheric | 23.775 | 1.288 | 1.821 | 24.1 |
| 11 | Aspheric | −144.264 | 2.204 | | |
| 12 | | ∞ | 0.500 | 1.517 | 64.2 |
| 13 | | ∞ | | | |

Next, the aspherical data in the first embodiment is shown in Table 2. It is to be noted that in the floating-point representation in Table 2, index base 10 is expressed by a letter symbol E, and the multiplication sign * is omitted. For example, $-0.12345*10^{-15}$ is expressed as −0.12345E−15 (this applies to Table 5, Table 8 and Table 11).

TABLE 2

| Surface | R | k | A | B | C | D |
|---|---|---|---|---|---|---|
| 2 | 5.197 | −0.7571 | −4.9115E−04 | 8.1271E−05 | −7.0593E−06 | 2.2531E−07 |
| 3 | 5.426 | −0.8026 | −9.1347E−04 | 7.2588E−05 | −1.3737E−05 | 2.6138E−06 |
| 4 | 8.622 | 0.7955 | −1.0131E−03 | 5.6205E−05 | −1.2237E−01 | 4.9175E−06 |
| 6 | 2.847 | −0.3483 | 4.6918E−03 | 1.6649E−03 | 2.1798E−04 | 1.9961E−04 |
| 7 | −14.705 | 1.0000 | 1.2041E−02 | 5.0070E−03 | −1.6771E−03 | 1.1331E−03 |
| 10 | 23.775 | −1.0000 | −9.5601E−03 | 4.3523E−04 | 3.2475E−05 | 2.9535E−06 |
| 11 | −144.264 | 1.0000 | −9.3534E−03 | 3.1293E−04 | 3.3541E−05 | −2.9535E−06 |

Next, the zoom data in the first embodiment is shown in Table 3. In Table 3, a term "spacing 2" denotes a distance (mm) between a second surface and a third surface, a term "spacing 4" denotes a distance (mm) between a fourth surface and a fifth surface, and a term "spacing 9" denotes a distance (mm) between a ninth surface and a tenth surface.

TABLE 3

| | Wide-angle end | Intermediate focal length | Telephoto end |
|---|---|---|---|
| Angle of view | 36.6 | 20.4 | 14.6 |
| Focal length | 4.80 | 9.60 | 13.68 |
| Spacing 2 | 5.017 | 1.431 | 1.331 |
| Spacing 4 | 4.726 | 3.689 | 0.980 |
| Spacing 9 | 2.295 | 6.918 | 9.719 |

Figure 5A:
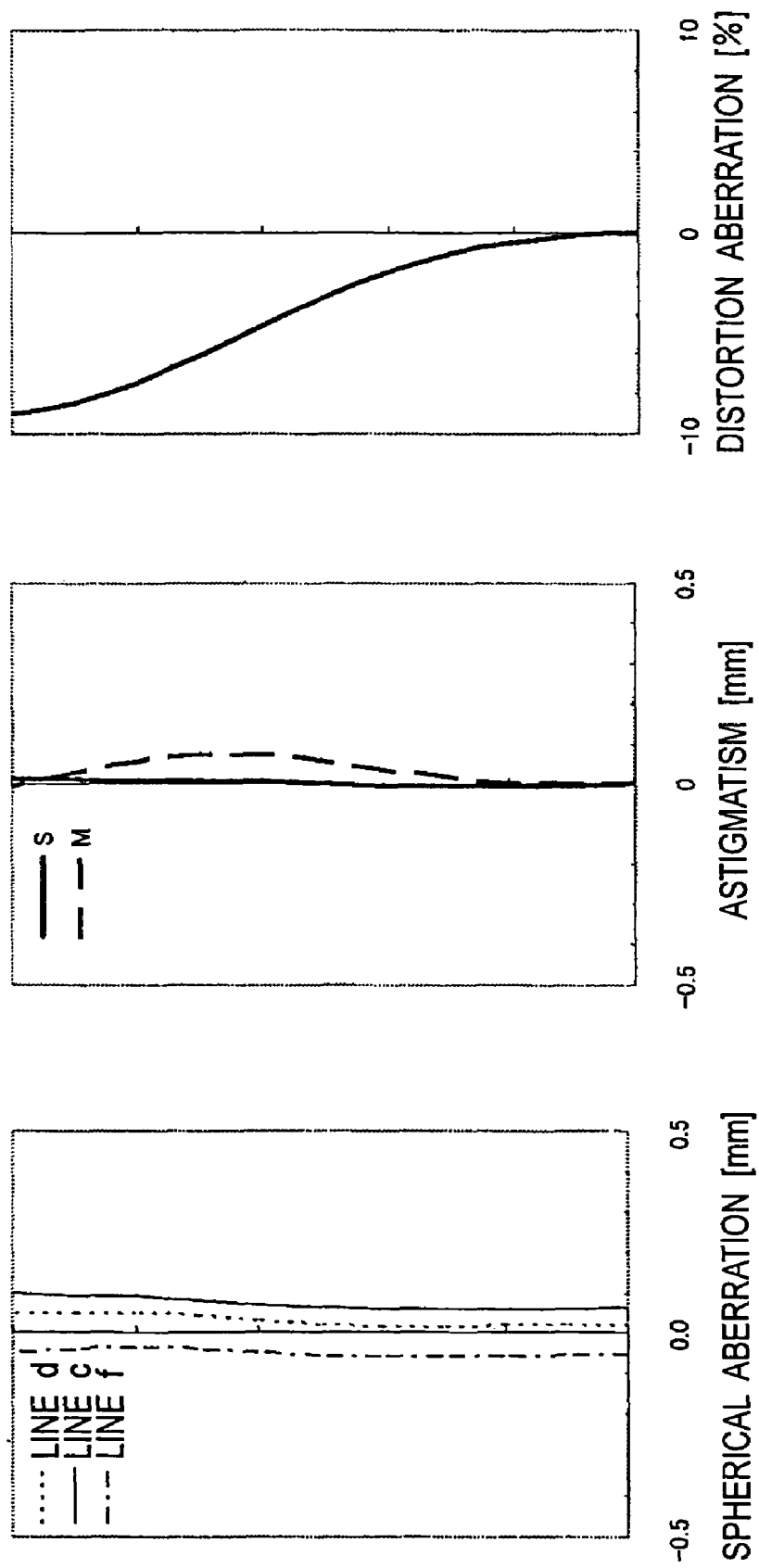
FIG. 5A is a view showing the aberration at an wide-angle end of the zoom lens in the first embodiment.
Figure 5B:
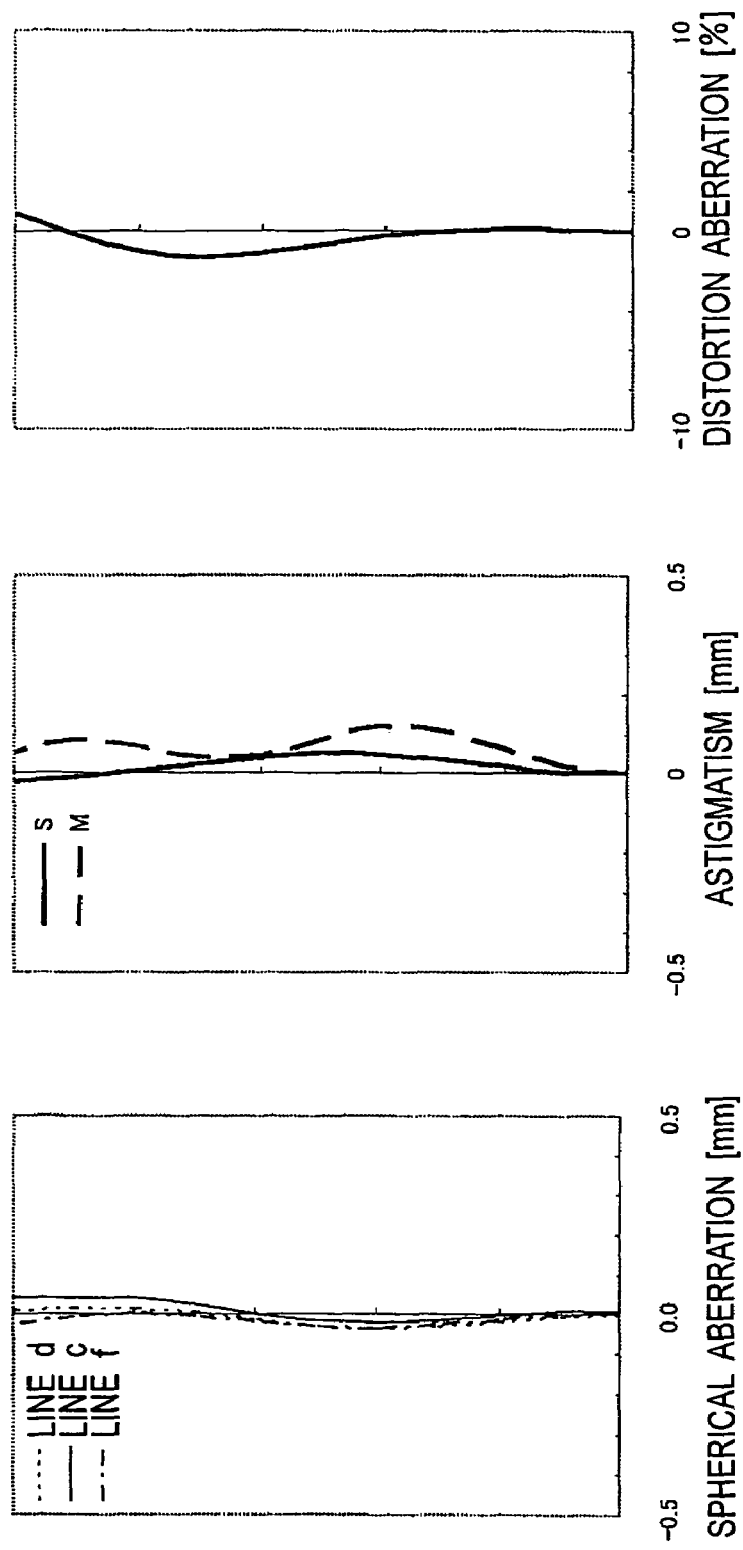
FIG. 5B is a view showing the aberration at an intermediate of the zoom lens.

FIGS. 5A to 5C are views showing the aberration at infinity corresponding to the first embodiment, in which FIG. 5A shows the aberration at a wide-angle end, FIG. 5B shows the aberration at an intermediate focal length, and FIG. 5C shows the aberration at a telephoto end, with spherical aberration, astigmatism, and distortion aberration being placed in order from the left hand-side.

In the spherical aberration view shown left hand-side in FIGS. 5A-5C, a dotted line represents a line d (wavelength of 587.6 nm), a solid line represents a line C (wavelength of 656.3 nm), and a chain line represents a line f (wavelength of 486.1 nm). In the anastigmatic aberration view shown middle in FIGS. 5A-5C, a solid line S represents a sagittal image surface, and a dotted line M represents a tangential image surface.

In the zoom lens in the first embodiment, as shown in FIGS. 5A to 5C, sufficient optical characteristics were achieved in terms of the spherical aberration, the astigmatism and the distortion aberration at the wide-angle end, the intermediate focal length and the telephoto end. Therefore, the zoom lens which is compact, large in zoom ratio and is high performance can be achieved with simple structure, and therefore, the small-size and slim zoom lens suitable for portable devices such as mobile phones and PDAs can be implemented.

Second Embodiment

FIG. 2 is a cross sectional view showing the structure of a zoom lens in the second embodiment of the present invention, in which FIG. 2A shows the zoom position at a wide-angle end in cross section, FIG. 2B shows the zoom position at an intermediate focal length in cross section and FIG. 2C shows the zoom position at a telephoto end in cross section. In FIG. 2, the left hand-side is an object side, while the right-hand side is an image plane side. Arrow lines in the drawing show the movement of lenses during zooming.

The zoom lens in the second embodiment is composed of, as shown in FIG. 2, a first lens group. G1 having negative refracting power, a second lens group G2 having positive refracting power, a third lens group G3 having positive refracting power and a fourth lens group G4 having positive refracting power, the first lens group G1, the second lens group G2, the third lens group G3 and the fourth lens group G4 being arranged in order from the object side to the image plane side. The zoom lens is of type in which the first lens group G1 and the fourth lens group G4 are fixed during variable magnification and focusing (achieving focus) operations, while the second lens group G2 and the third lens group G3 move along an optical axis for performing variable magnification and focusing.

The first lens group G1 is a meniscus lens 21 with its convex surface facing the object side, and the second lens group G2 is a lens 22 having positive refracting power with its convex surface facing the object side while its concave surface facing the image plane side. The third lens group G3 includes an aperture stop s, a lens 23 having positive refracting power and a lens 24 having negative refracting power, the aperture stop s, the lens 23 and the lens 24 being arranged in order from the object side to the image plane side. The fourth lens group G4 is a lens 25 having positive refracting power with its concave surface facing the object side while its convex surface facing the image plane side. A glass block f such as filters is placed on the image plane side of the fourth lens group G4.

The aperture stop s is provided on the object side of the third lens group G3, and the aperture stop s and the lenses 23, 24 move integrally.

In the above zoom lens structure, fixing the first lens group G1 and the fourth lens group G4 makes it easy to enhance sealability of the zoom lens and to achieve excellent dust control and sufficient robustness.

Furthermore, the third lens group G3 having an aperture stop s is structured from a lens 23 having positive refracting power and a lens 24 having negative lens made of a plurality of different materials, so that it becomes possible to minimize the increase in the overall length of the zoom lens while correcting chromatic aberration.

Moreover, by placing the third lens group G3 so that the aperture stop s, the lens 23 having positive refracting power and the lens 24 having negative refracting power are arranged in order from the object side to the image plane side, the effective diameter of the lens 23 and the lens 24 may be set at the same level as the effective diameter of the aperture stop. Reducing the effective diameter of the aperture stop s makes it possible to reduce the effective diameter of the lenses in the third lens group G3.

In the second embodiment, the second lens group G2 moves to the object side at the time of zooming from the wide-angle end to the intermediate and then moves to the image plane side at the time of zooming from the intermediate to the telephoto end. The movable range of the third lens group G3 is secured by setting the travel amount of the second lens group G2 to the image plane side to be 1/10 or less of the overall length in the driving range of the second lens group G2. When the travel amount of the second lens group G2 to the image plane side becomes larger than the above setting, the movable range of the third lens group G3 is limited by the second lens group G2, which disables the sufficient magnifying power from being obtained.

In the zoom lens having the above structure, a shortest distance between the third lens group G3 and the fourth lens group G4 is 2 mm or more, that is a relatively large distance, so that a mechanical shutter 27 can be provided in this space. In this case, if a shutter is placed in between the third lens group G3 and the fourth lens group G4 in the vicinity of the third lens group G3 so that the shutter move integrally with the third lens group G3, it becomes possible to reduce the aperture diameter because the shutter is close to the aperture stop s, which is advantageous for downsizing. Different from the case where the shutter is provided in the vicinity of the image plane, the shutter can be released at a position where luminous flux is gathered, and therefore it becomes possible to suppress reduction in peripheral light amount due to shutter speed.

In the zoom lens in the second embodiment, by using the meniscus lens 21 with its convex surface facing the object side as the first lens group G1 having negative refracting power, it becomes possible to keep a peripheral light amount rate high at the wide-angle end.

Moreover, forming the surface of the meniscus lens 21 of the first lens group G1 on the image plane side aspherical makes it possible to achieve sufficient aberration correction of off-axis light beams and to structure the first lens group G1 from one lens, which are advantageous for downsizing.

Moreover, using low-dispersion glass materials having high refractive index to constitute the first lens group G1 is effective for aberration correction because it becomes possible to increase the radius of curvature of the lens while it is also effective for downsizing because the thickness of the lens is decreased.

Now, Tables 4 to 6 show numerical examples of the zoom lens in the second embodiment. The numerical examples of the surface data shown in Table 4 show data on the respective surfaces in order from the object side, the data including a radius of curvature, a lens thickness or a space, a refractive index with respect to line d and an Abbe number with respect to line d. The aspherical surfaces in Tables 4 and 5 are formed into aspherical surfaces expressed by the above (equation 1).

TABLE 4

| Surface | | Radius of curvature | Axial spacing | Refractive index | Abbe number |
|---|---|---|---|---|---|
| 1 | | 85.182 | 0.800 | 1.806 | 40.7 |
| 2 | Aspheric | 5.377 | Variable | | |
| 3 | Aspheric | 5.856 | 1.136 | 1.821 | 24.1 |
| 4 | Aspheric | 9.185 | Variable | | |
| 5 | Stop | ∞ | 0.100 | | |
| 6 | Aspheric | 2.577 | 1.265 | 1.589 | 61.3 |

TABLE 4-continued

| Surface | | Radius of curvature | Axial spacing | Refractive index | Abbe number |
|---|---|---|---|---|---|
| 7 | Aspheric | −13.859 | 0.307 | | |
| 8 | | 10.811 | 0.900 | 1.847 | 23.8 |
| 9 | | 2.706 | Variable | | |
| 10 | Aspheric | 177.531 | 1.345 | 1.821 | 24.1 |
| 11 | Aspheric | −21.120 | 1.806 | | |
| 12 | | ∞ | 0.500 | 1.517 | 64.2 |
| 13 | | ∞ | | | |

Next, the aspherical data in the second embodiment is shown in Table 5.

TABLE 5

| Surface | R | k | A | B | C | D |
|---|---|---|---|---|---|---|
| 2 | 5.377 | −0.5478 | −1.3626E−13 | 6.6750E−05 | −7.2294E−06 | 2.5478E−07 |
| 3 | 5.856 | −0.4176 | −5.8212E−04 | −1.4765E−04 | 3.2005E−05 | −1.4571E−07 |
| 4 | 9.185 | −0.7003 | −6.2275E−04 | −2.0603E−04 | 6.6839E−05 | −1.1119E−06 |
| 6 | 2.577 | −0.4622 | 4.1894E−03 | 2.5944E−03 | −2.6155E−04 | 3.8769E−04 |
| 7 | −13.859 | −0.3843 | 1.3565E−02 | 5.9339E−03 | −2.5111E−03 | 1.7132E−03 |
| 10 | 177.531 | −1.0000 | −9.5264E−03 | 5.0957E−04 | 3.8019E−05 | −3.3353E−06 |
| 11 | −21.120 | 0.6999 | −8.7471E−03 | 1.6765E−04 | 5.7223E−05 | −3.0914E−06 |

Next, the zoom data in the second embodiment is shown in Table 6.

TABLE 6

| | Wide-angle end | Intermediate focal length | Telephoto end |
|---|---|---|---|
| Angle of view | 36.6 | 20.4 | 14.6 |
| Focal length | 4.8 | 9.6 | 13.68 |
| Spacing 2 | 4.642 | 1.238 | 1.251 |
| Spacing 4 | 4.315 | 3.410 | 0.850 |
| Spacing 9 | 2.384 | 6.693 | 9.240 |

Figure 6A:
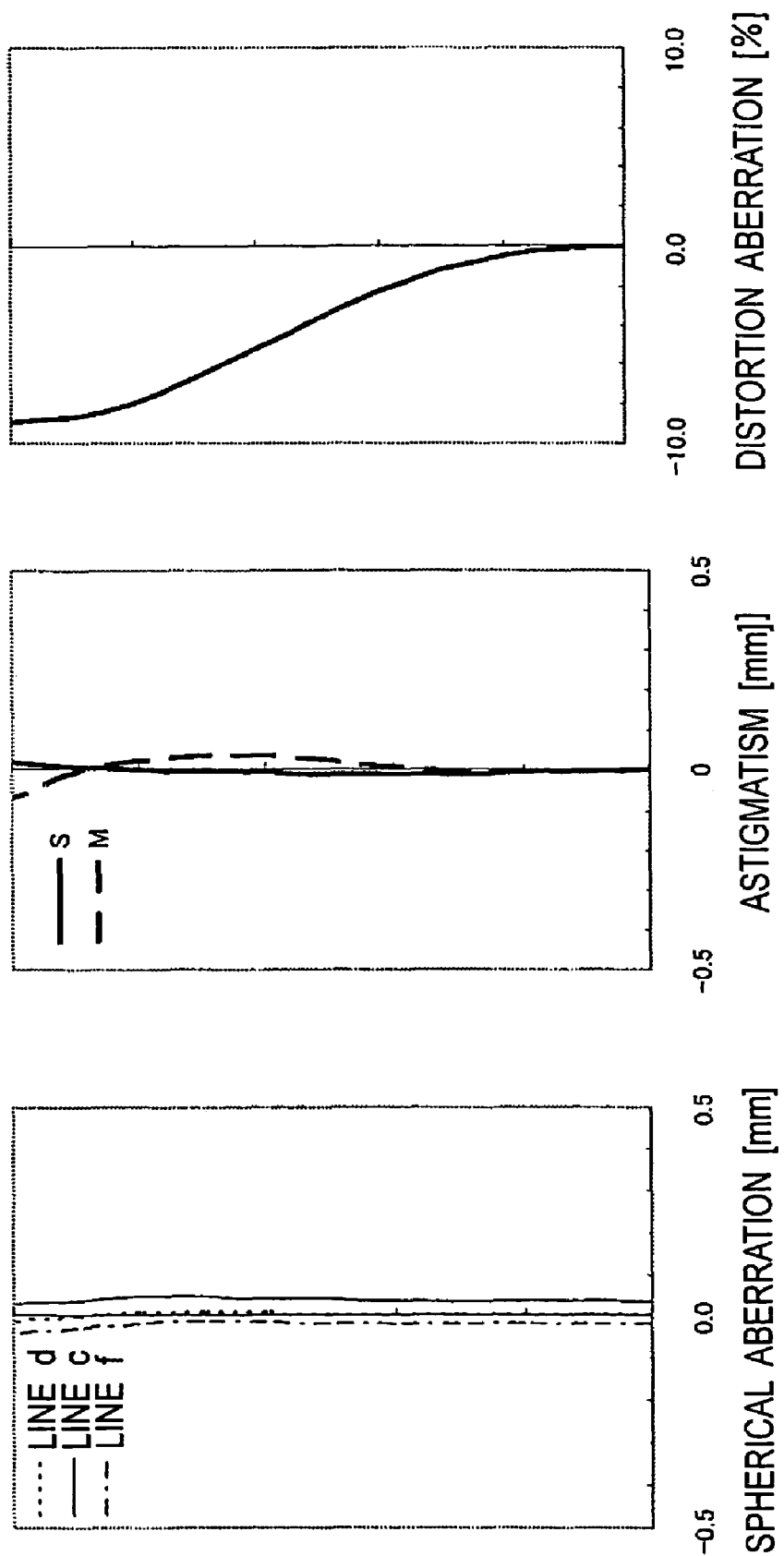
FIG. 6A is a view showing the aberration at an wide-angle end of the zoom lens in the second embodiment.

FIGS. 6A to 6C are views showing the aberration at infinity corresponding to the second embodiment, in which FIG. 6A shows the aberration at a wide-angle end, FIG. 6B shows the aberration at an intermediate focal length, and FIG. 6C shows the aberration at a telephoto end, with spherical aberration, astigmatism, and distortion aberration being placed in order from the left hand-side.

In the spherical aberration view shown left hand-side in FIGS. 6A-6C, a dotted line represents a line d (wavelength of 587.6 nm), a solid line represents a line C (wavelength of 656.3 nm), and a chain line represents a line f (wavelength of 486.1 nm). In the anastigmatic aberration view shown middle in FIGS. 6A-6C, a solid line S represents a sagittal image surface, and a dotted line M represents a tangential image surface.

In the zoom lens in the second embodiment, as shown in FIGS. 6A to 6C, sufficient optical characteristics were achieved in terms of the spherical aberration, the astigmatism and the distortion aberration at the wide-angle end, the intermediate focal length and the telephoto end. Therefore, the zoom lens which is compact, large in zoom ratio and is high performance can be achieved with simple structure, and therefore, the small-size and slim zoom lens suitable for portable devices such as mobile phones and PDAs can be implemented.

Third Embodiment

FIG. 3 is a cross sectional view showing the structure of a zoom lens in the third embodiment of the present invention, in which FIG. 3A shows the zoom position at a wide-angle end in cross section, FIG. 3B shows the zoom position at an intermediate focal length in cross section and FIG. 3C shows the zoom position at a telephoto end in cross section. In FIG. 3, the left hand-side is an object side, while the right-hand side is an image plane side. Arrow lines in the drawing show the movement of lenses during zooming.

The zoom lens in the third embodiment is composed of, as shown in FIG. 3, a first lens group G1 having negative refracting power, a second lens group G2 having positive refracting power, a third lens group G3 having positive refracting power and a fourth lens group G4 having positive refracting power, the first lens group G1, the second lens group G2, the third lens group G3 and the fourth lens group G4 being arranged in order from the object side to the image plane side. The zoom lens is of type in which the first lens group G1 and the fourth lens group G4 are fixed during variable magnification and focusing (achieving focus) operations, while the second lens group G2 and the third lens group G3 move along an optical axis for performing variable magnification and focusing.

The first lens group G1 is a meniscus lens 31 with its convex surface facing the object side, and the second lens group G2 is a lens 32 having positive refracting power with its convex surface facing the object side while its concave surface facing the image plane side. The third lens group G3 includes an aperture stop s, a lens 33 having positive refracting power and a lens 34 having negative refracting power, the aperture stop s, the lens 33 and the lens 34 being arranged in order from the object side to the image plane side. The fourth lens group G4 is a lens 35 having positive refracting power with its concave surface facing the object side while its convex surface facing the image plane side. A glass block f such as filters is placed on the image plane side of the fourth lens group G4.

The aperture stop s is provided on the object side of the third lens group G3, and the aperture stop s and the lenses 33, 34 move integrally.

In the above zoom lens structure, fixing the first lens group G1 and the fourth lens group G4 makes it easy to enhance sealability of the zoom lens and to achieve excellent dust control and sufficient robustness.

Furthermore, the third lens group G3 having an aperture stop s is structured from a lens 33 having positive refracting power and a lens 34 having negative lens made of a plurality of different materials, so that it becomes possible to minimize the increase in the overall length of the zoom lens while correcting chromatic aberration.

Moreover, by placing the third lens group G3 so that the aperture stop s, the lens 33 having positive refracting power and the lens 34 having negative refracting power are arranged in order from the object side to the image plane side, the effective diameter of the lens 33 and the lens 34 may be set at the same level as the effective diameter of the aperture stop. Reducing the effective diameter of the aperture stop s makes it possible to reduce the effective diameter of the lenses in the third lens group G3.

In the third embodiment, the second lens group G2 moves to the object side at the time of zooming from the wide-angle end to the intermediate and then moves to the image plane side at the time of zooming from the intermediate to the telephoto end. The movable range of the third lens group G3 is secured by setting the travel amount of the second lens group G2 to the image plane side to be 1/10 or less of the overall length in the driving range of the second lens group G2. When the travel amount of the second lens group G2 to the image plane side becomes larger than the above setting, the movable range of the third lens group G3 is limited by the second lens group G2, which disables the sufficient magnifying power from being obtained.

In the zoom lens having the above structure, a shortest distance between the third lens group G3 and the fourth lens group G4 is 2 mm or more, that is a relatively large distance, so that a mechanical shutter 37 can be provided in this space. In this case, if a shutter is placed in between the third lens group G3 and the fourth lens group G4 in the vicinity of the third lens group G3 so that the shutter move integrally with the third lens group G3, it becomes possible to reduce the aperture diameter of the shutter because the shutter is close to the aperture stop s, which is advantageous for downsizing. Different from the case where the shutter is provided in the vicinity of the image plane, the shutter can be released at a position where luminous flux is gathered, and therefore it becomes possible to suppress reduction in peripheral light amount due to shutter speed.

In the zoom lens in the third embodiment, by using the meniscus lens 31 with its convex surface facing the object side as the first lens group G1 having negative refracting power, it becomes possible to keep a peripheral light amount rate high also at the wide-angle end.

Moreover, forming the surface of the meniscus lens 31 of the first lens group G1 on the image plane side aspherical makes it possible to achieve sufficient aberration correction of off-axis light beams and to structure the first lens group G1 from one lens, which are advantageous for downsizing.

Moreover, using low-dispersion glass materials having high refractive index to constitute the first lens group G1 is effective for aberration correction because it becomes possible to increase the radius of curvature of the lens while it is also effective for downsizing because the thickness of the lens is decreased.

In the third embodiment, materials having 1.85 or more refractive index, which is impossible to achieve by molding glass materials, are used for the first lens group G1, and further, the image plane-side surface is formed to be aspherical with the resin layer 30 so as to enhance characteristics. It is not desirable to form the resin layer 30 on the object side because the fragile resin surface is exposed to the outside of the zoom lens.

Now, Tables 7 to 9 show numerical examples of the zoom lens in the third embodiment. The numerical examples of the surface data shown in Table 7 show data on the respective surfaces in order from the object side, the data including a radius of curvature, a lens thickness or a space, a refractive index with respect to line d and an Abbe number with respect to line d. The aspherical surfaces in Tables 7 and 8 are formed into aspherical surfaces expressed by the above (equation 1).

TABLE 7

| Surface | | Radius of curvature | Axial spacing | Refractive index | Abbe number |
|---|---|---|---|---|---|
| 1 | | 73.047 | 0.800 | 1.883 | 40.8 |
| 2 | | 5.448 | 0.020 | 1.530 | 45.0 |
| 3 | Aspheric | 4.859 | Variable | | |
| 4 | Aspheric | 5.733 | 1.263 | 1.821 | 24.1 |
| 5 | Aspheric | 10.925 | Variable | | |
| 6 | Stop | ∞ | 0.100 | | |
| 7 | Aspheric | 2.552 | 1.261 | 1.589 | 61.3 |
| 8 | Aspheric | −16.082 | 0.326 | | |
| 9 | | 11.411 | 0.900 | 1.847 | 23.8 |
| 10 | | 2.807 | Variable | | |
| 11 | Aspheric | 266.725 | 1.325 | 1.821 | 24.1 |
| 12 | Aspheric | −23.732 | 1.623 | | |
| 13 | | ∞ | 0.500 | 1.517 | 64.2 |
| 14 | | ∞ | | | |

Next, the aspherical data in the third embodiment is shown in Table 8.

TABLE 8

| Surface | R | k | A | B | C | D |
|---|---|---|---|---|---|---|
| 3 | 4.859 | −0.6092 | −9.7687E−04 | 9.1153E−05 | −6.1575E−06 | 1.1612E−07 |
| 4 | 5.733 | −0.1755 | −7.1164E−04 | −1.0518E−04 | 2.3009E−05 | −1.6582E−07 |
| 5 | 10.925 | 0.9843 | −3.9293E−04 | −1.5167E−04 | 4.3342E−05 | −5.5031E−07 |
| 7 | 2.552 | −0.3670 | 4.6806E−03 | 2.8473E−03 | −3.4749E−04 | 4.5226E−04 |
| 8 | −16.082 | −1.0000 | 1.5184E−02 | 7.0825E−03 | −3.3102E−03 | 2.2210E−03 |
| 11 | 266.725 | 1.0000 | −6.1009E−03 | −6.4503E−04 | 1.4519E−04 | −7.0015E−06 |
| 12 | −23.732 | 1.0000 | −5.5032E−03 | −6.4740E−04 | 1.1384E−04 | −4.4455E−06 |

Next, the zoom data in the third embodiment is shown in Table 9.

TABLE 9

| | Wide-angle end | Intermediate focal length | Telephoto end |
|---|---|---|---|
| Angle of view | 36.6 | 20.4 | 14.6 |
| Focal length | 4.8 | 9.6 | 13.68 |
| Spacing 2 | 3.744 | 1.092 | 1.126 |
| Spacing 4 | 5.165 | 3.434 | 0.850 |
| Spacing 9 | 2.473 | 6.857 | 9.406 |

Figure 7A:
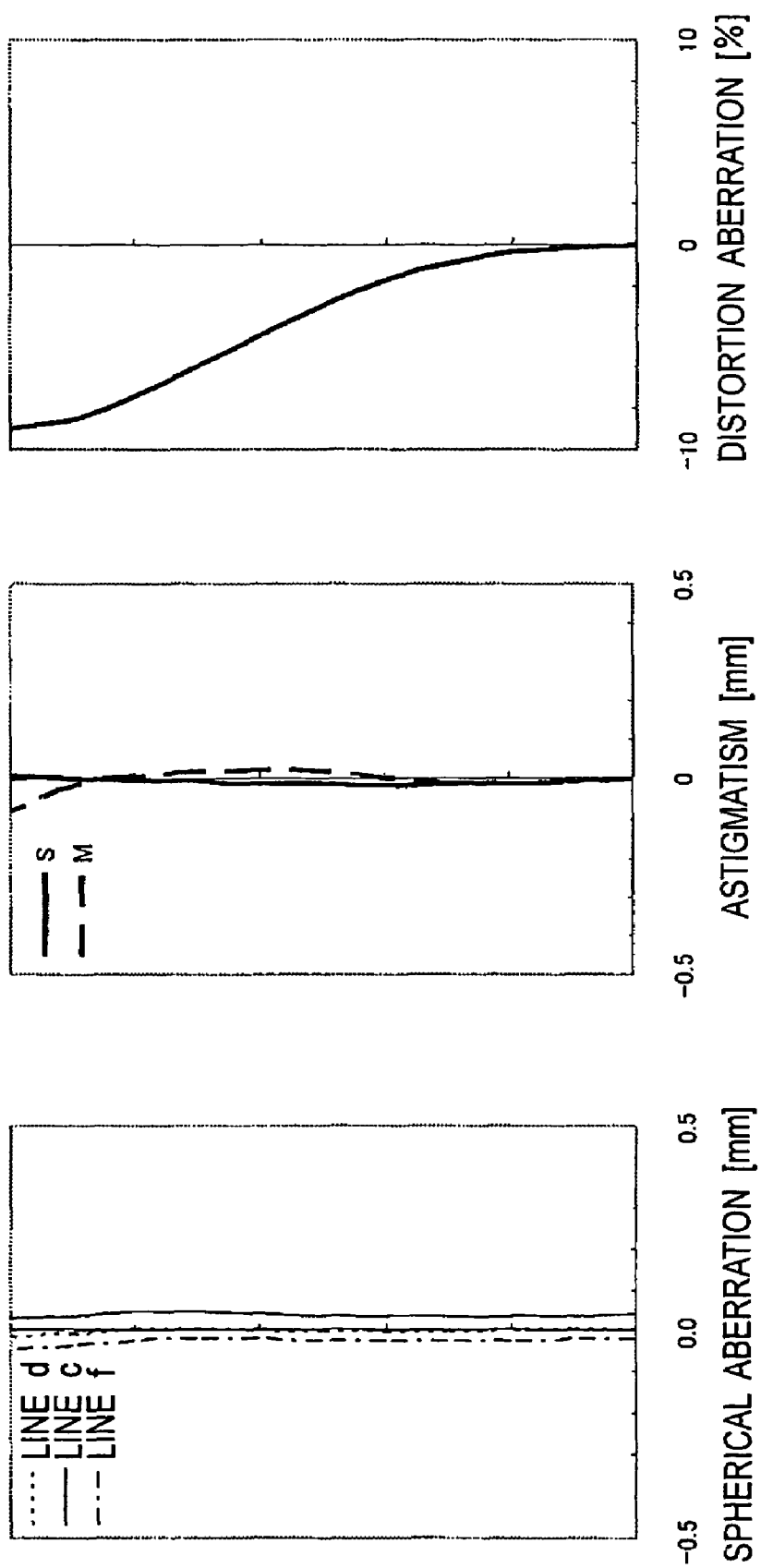
FIG. 7A is a view showing the aberration at an wide-angle end of the zoom lens in the third embodiment.

FIGS. 7A to 7C are views showing the aberration at infinity corresponding to the third embodiment, in which FIG. 7A shows the aberration at a wide-angle end, FIG. 7B shows the aberration at an intermediate focal length, and FIG. 7C shows the aberration at a telephoto end, with spherical aberration, astigmatism, and distortion aberration being placed in order from the left hand-side.

In the spherical aberration view shown left hand-side in FIGS. 7A-7C, a dotted line represents a line d (wavelength of 587.6 nm), a solid line represents a line C (wavelength of 656.3 nm), and a chain line represents a line f (wavelength of 486.1 nm). In the anastigmatic aberration view shown middle in FIGS. 7A-7C, a solid line S represents a sagittal image surface, and a dotted line M represents a tangential image surface.

In the zoom lens in the third embodiment, as shown in FIGS. 7A to 7C, sufficient optical characteristics were achieved in terms of the spherical aberration, the astigmatism and the distortion aberration at the wide-angle end, the intermediate focal length and the telephoto end. Therefore, the zoom lens which is compact, large in zoom ratio and is high performance can be achieved with simple structure, and therefore, the small-size and slim zoom lens suitable for portable devices such as mobile phones and PDAs can be implemented.

Fourth Embodiment

Figure 4B:
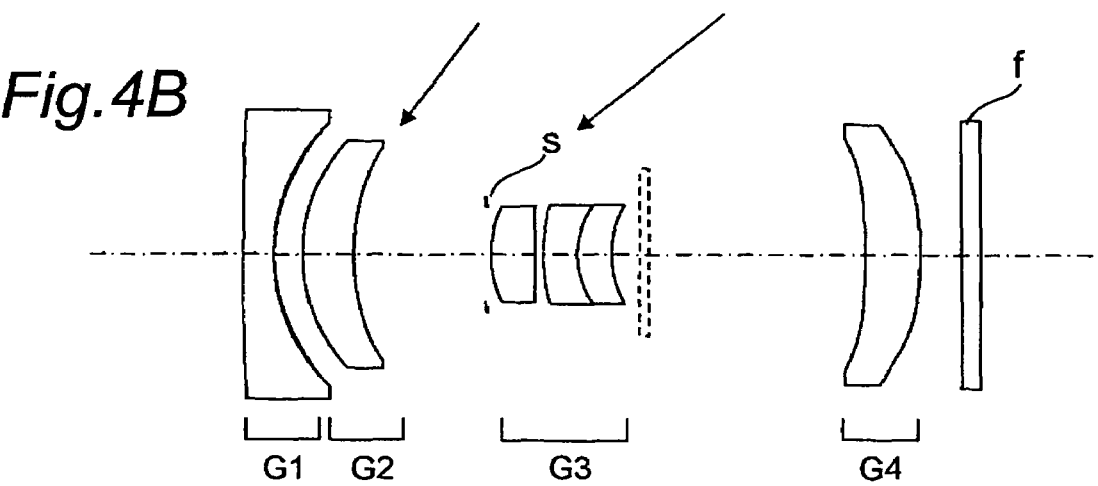
Figure 4C:
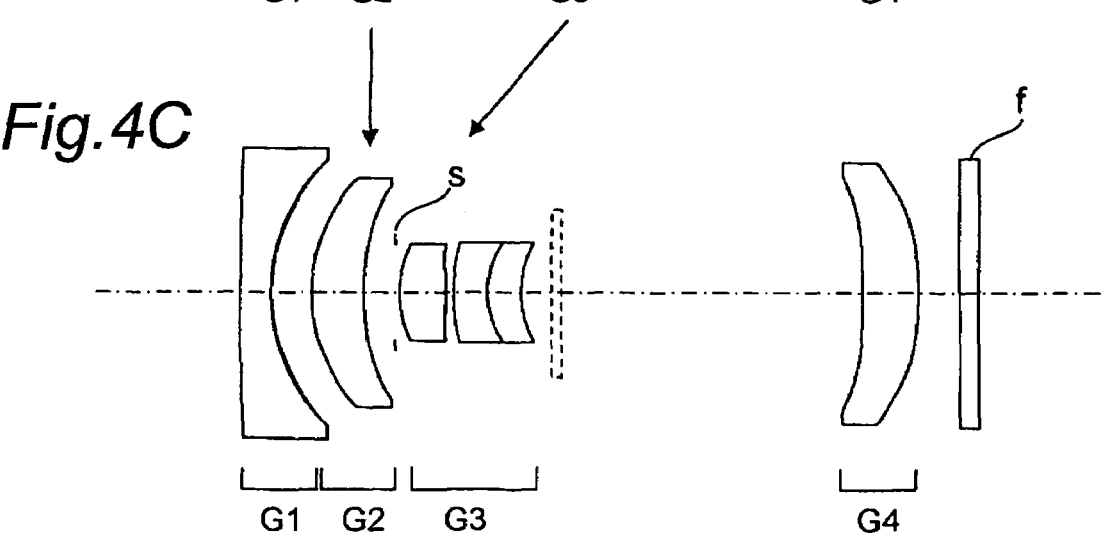

FIG. 4 is a cross sectional view showing the structure of a zoom lens in the fourth embodiment of the present invention, in which FIG. 4A shows the zoom position at a wide-angle end in cross section, FIG. 4B shows the zoom position at an intermediate focal length in cross section and FIG. 4C shows the zoom position at a telephoto end in cross section. In FIG. 4, the left hand-side is an object side, while the right-hand side is an image plane side. Arrow lines in the drawing show the movement of lenses during zooming.

The zoom lens in the fourth embodiment is composed of, as shown in FIG. 4, a first lens group G1 having negative refracting power, a second lens group G2 having positive refracting power, a third lens group G3 having positive refracting power and a fourth lens group G4 having positive refracting power, the first lens group G1, the second lens group G2, the third lens group G3 and the fourth lens group G4 being arranged in order from the object side to the image plane side. The zoom lens is of type in which the first lens group G1 and the fourth lens group G4 are fixed during variable magnification and focusing (achieving focus) operations, while the second lens group G2 and the third lens group G3 move along an optical axis for performing variable magnification and focusing.

The first lens group G1 is a meniscus lens 41 with its convex surface facing the object side, and the second lens group G2 is a lens 42 having positive refracting power with its convex surface facing the object side while its concave surface facing the image plane side. The third lens group G3 includes an aperture stop s, a lens 43 having positive refracting power, a lens 44 having negative refracting power and a lens 45 having negative refracting power, the aperture stop s, the lens 43, the lens 44 and the lens 45 being arranged in order from the object side to the image plane side. The fourth lens group G4 is a lens 46 having positive refracting power with its concave surface facing the object side while its convex surface facing the image plane side. A glass block f such as filters is placed on the image plane side of the fourth lens group G4.

The aperture stop s and the lenses 33, 34 in the third lens group G3 move integrally.

In the above zoom lens structure, fixing the first lens group G1 and the fourth lens group G4 makes it easy to enhance sealability of the zoom lens and to achieve excellent dust control and sufficient robustness.

Furthermore, the third lens group G3 having an aperture stop s is structured from a lens 43 having positive refracting power and lens 44, 45 having negative lens made of a plurality of different materials, so that it becomes possible to minimize the increase in the overall length of the zoom lens while correcting chromatic aberration.

Moreover, by placing the third lens group G3 so that the aperture stop s, the lens 43 having positive refracting power and the lens 44, 45 having negative refracting power are arranged in order from the object side to the image plane side, the effective diameter of the lens 43 and the lens 44, 45 may be set at the same level as the effective diameter of the aperture stop. Reducing the effective diameter of the aperture stop s makes it possible to reduce the effective diameter of the lenses in the third lens group G3.

In the fourth embodiment, the second lens group G2 moves to the object side at the time of zooming from the wide-angle end to the intermediate and then moves to the image plane side at the time of zooming from the intermediate to the telephoto end. The movable range of the third lens group G3 is secured by setting the travel amount of the second lens group G2 to the image plane side to be 1/10 or less of the overall length in the driving range of the second lens group G2. When the travel amount of the second lens group G2 to the image plane side becomes larger than the above setting, the movable range of the third lens group G3 is limited by the second lens group G2, which disables the sufficient magnifying power from being obtained.

In the zoom lens having the above structure, a shortest distance between the third lens group G3 and the fourth lens group G4 is 2 mm or more, that is a relatively large distance, so that a mechanical shutter 47 can be provided in this space. In this case, if a shutter is placed in between the third lens group G3 and the fourth lens group G4 in the vicinity of the third lens group G3 so that the shutter move integrally with the third lens group G3, it becomes possible to reduce the aperture diameter of the shatter because the shutter is close to the aperture stop s, which is advantageous for downsizing. Different from the case where the shutter is provided in the vicinity of the image plane, the shutter can be released at a position where luminous flux is gathered, and therefore it becomes possible to suppress reduction in peripheral light amount due to shutter speed.

In the zoom lens in the fourth embodiment, by using the meniscus lens 41 with its convex surface facing the object side as the first lens group G1 having negative refracting power, it becomes possible to keep a peripheral light amount rate high also at the wide-angle end.

Moreover, forming the surface of the meniscus lens 41 of the first lens group G1 on the image plane side aspherical makes it possible to achieve sufficient aberration correction of off-axis light beams and to structure the first lens group G1 from one lens, which are advantageous for downsizing.

Moreover, using low-dispersion glass materials having high refractive index to constitute the first lens group G1 is effective for aberration correction because it becomes possible to increase the radius of curvature of the lens while it is also effective for downsizing because the thickness of the lens is decreased.

In the fourth embodiment, materials having 1.85 or more refractive index, which is impossible to achieve by molding glass materials, are used for the first lens group G1, and further, the image plane-side surface is formed to be aspherical with the resin layer 40 so as to enhance characteristics. It is not desirable to form the resin layer 40 on the object side because the fragile resin surface is exposed to the outside of the zoom lens.

In the fourth embodiment, aberration is further suppressed by structuring the third lens group G3 from three lenses. Since the effective diameter of the third lens group is small, it becomes possible to use additional lenses with a small effective diameter and a small thickness. This makes it possible to decrease an influence on the increase in the overall lens length.

Now, Tables 10 to 12 show numerical examples of the zoom lens in the fourth embodiment. The numerical examples of the surface data shown in Table 10 show data on the respective surfaces in order from the object side, the data including a radius of curvature, a lens thickness or a space, a refractive index with respect to line d and an Abbe number with respect to line d. The aspherical surfaces in Tables 10 and 11 are formed into aspherical surfaces expressed by the above (equation 1).

TABLE 10

| Surface | | Radius of curvature | Axial spacing | Refractive index | Abbe number |
|---|---|---|---|---|---|
| 1 | | 100.000 | 0.800 | 1.883 | 40.8 |
| 2 | | 5.115 | 0.020 | 1.530 | 45.0 |
| 3 | Aspheric | 4.509 | Variable | | |
| 4 | Aspheric | 4.455 | 1.374 | 1.821 | 24.1 |
| 5 | Aspheric | 7.006 | Variable | | |
| 6 | Stop | ∞ | 0.100 | | |
| 7 | Aspheric | 3.034 | 1.196 | 1.589 | 61.3 |
| 8 | Aspheric | −25.251 | 0.219 | | |
| 9 | | 5.471 | 0.900 | 1.847 | 23.8 |
| 10 | | 2.300 | 0.900 | 1.603 | 65.5 |
| 11 | | 2.677 | Variable | | |
| 12 | Aspheric | −36.018 | 1.459 | 1.821 | 24.1 |
| 13 | Aspheric | −10.589 | 1.091 | | |
| 14 | | ∞ | 0.500 | 1.517 | 64.2 |
| 15 | | ∞ | | | |

Next, the aspherical data in the fourth embodiment is shown in Table 11.

TABLE 11

| Surface | R | k | A | B | C | D |
|---|---|---|---|---|---|---|
| 3 | 4.509 | −0.7026 | −1.5658E−03 | 2.8037E−04 | −2.4585E−05 | 6.6496E−07 |
| 4 | 4.455 | −0.4397 | −5.0045E−04 | 8.2271E−05 | −3.2476E−06 | 7.2740E−07 |
| 5 | 7.006 | 1.0000 | 1.9793E−04 | −8.7272E−05 | 2.6088E−05 | 1.4774E−07 |
| 7 | 3.034 | −0.5297 | 3.9650E−03 | 1.2689E−03 | 1.1961E−04 | 1.0386E−04 |
| 8 | −25.251 | 1.0000 | 8.8925E−03 | 2.2098E−03 | −1.6329E−04 | 3.4290E−04 |
| 12 | −36.018 | −1.0000 | −2.3485E−03 | −9.0766E−04 | 1.3425E−04 | −5.4888E−06 |
| 13 | −10.589 | −0.9134 | −1.6135E−03 | −9.1806E−04 | 1.1103E−04 | −3.7570E−06 |

Next, the zoom data in the fourth embodiment is shown in Table 12.

TABLE 12

| | Wide-angle end | Intermediate focal length | Telephoto end |
|---|---|---|---|
| Angle of view | 36.6 | 20.4 | 14.6 |
| Focal length | 4.8 | 9.6 | 13.68 |
| Spacing 2 | 2.552 | 0.733 | 1.056 |
| Spacing 4 | 5.863 | 3.503 | 0.850 |
| Spacing 9 | 2.526 | 6.704 | 9.034 |

Figure 8A:
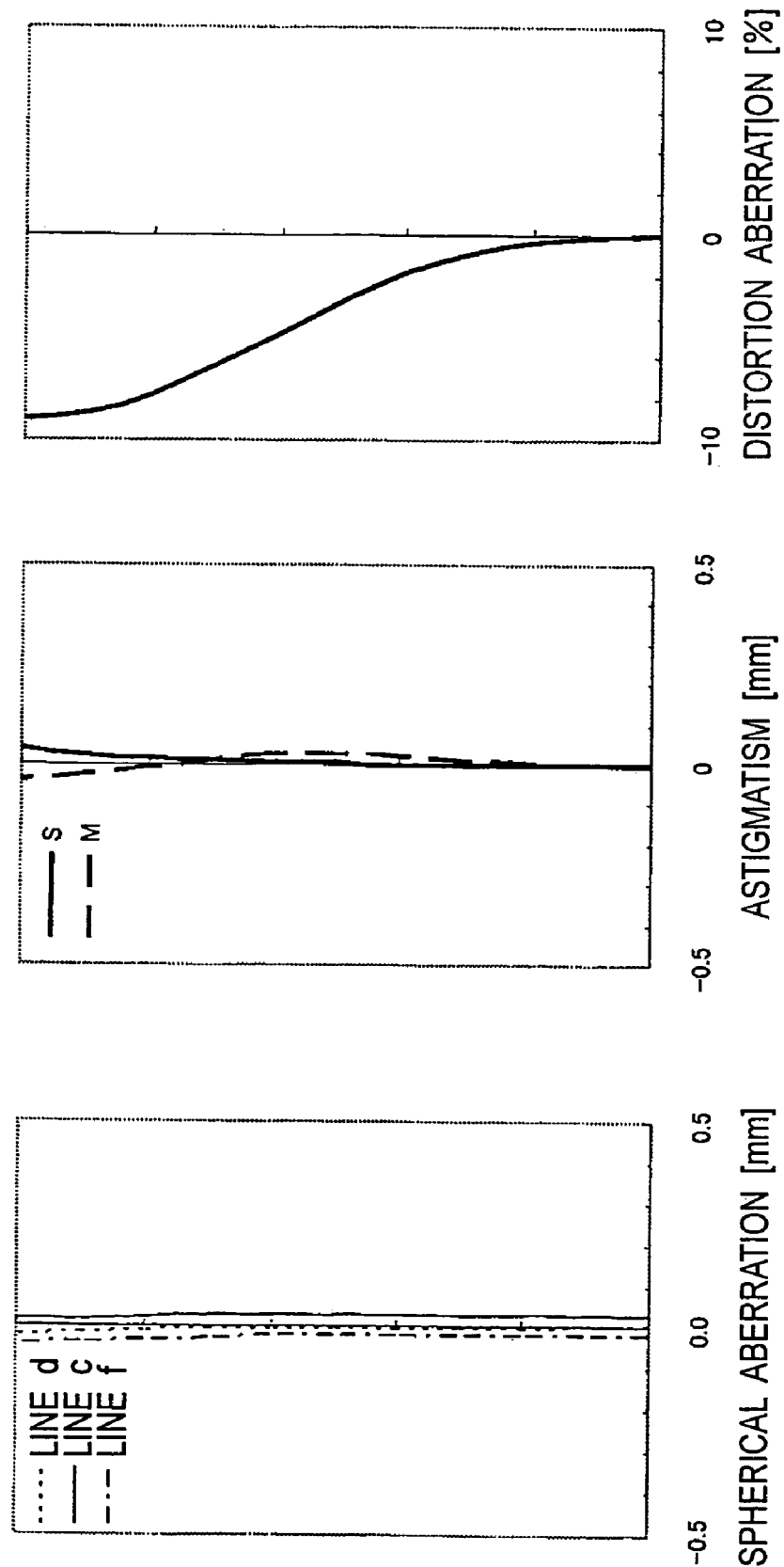
FIG. 8A is a view showing the aberration at an wide-angle end of the zoom lens in the fourth embodiment.
Figure 8B:
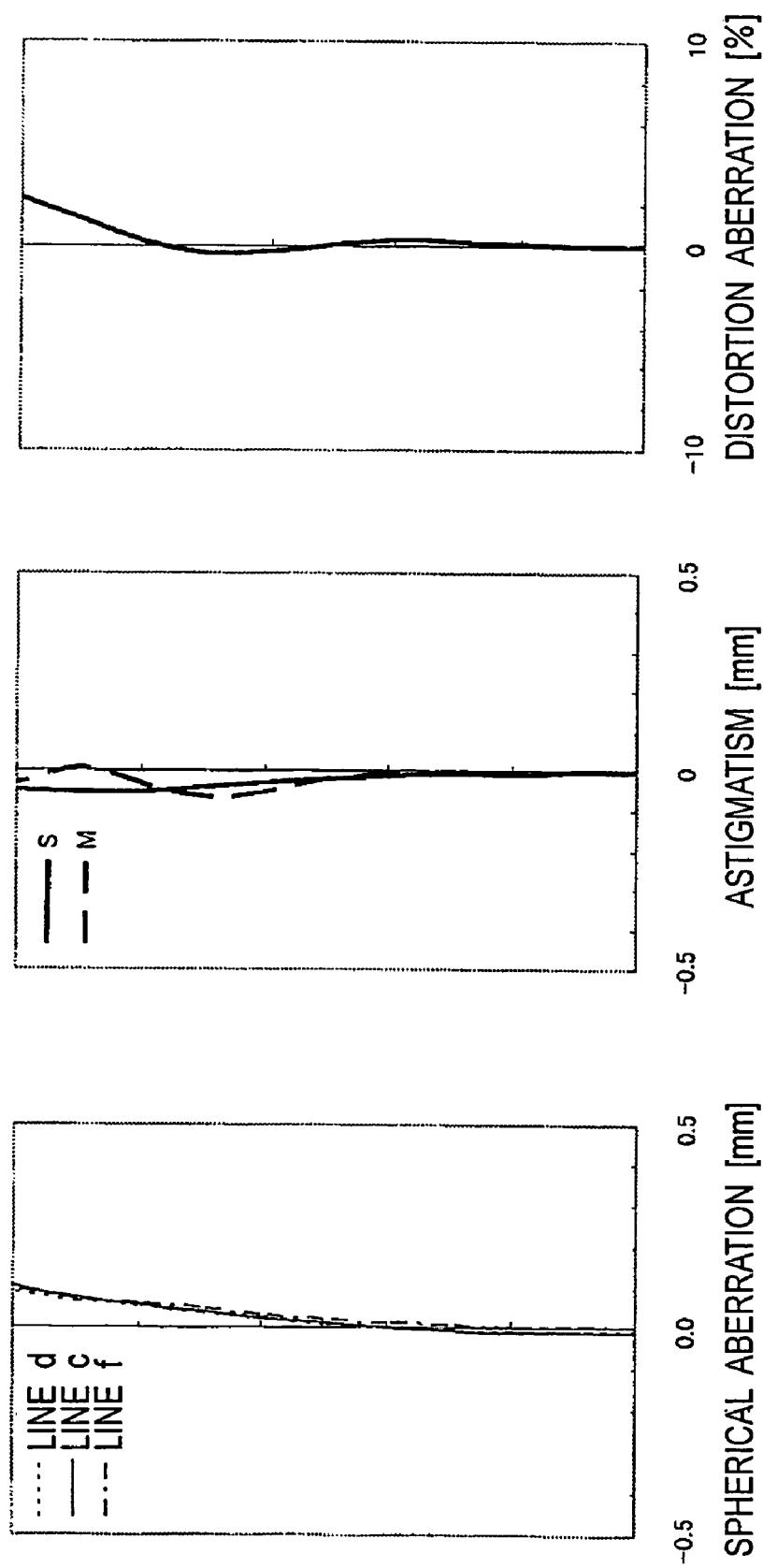
FIG. 8B is a view showing the aberration at an intermediate of the zoom lens.

FIGS. 8A to 8C are views showing the aberration at infinity corresponding to the fourth embodiment, in which FIG. 8A shows the aberration at a wide-angle end, FIG. 8B shows the aberration at an intermediate focal length, and FIG. 8C shows the aberration at a telephoto end, with spherical aberration, astigmatism, and distortion aberration being placed in order from the left hand-side.

In the spherical aberration view shown left hand-side in FIGS. 8A-8C, a dotted line represents a line d (wavelength of 587.6 nm), a solid line represents a line C (wavelength of 656.3 nm), and a chain line represents a line f (wavelength of 486.1 nm). In the anastigmatic aberration view shown middle in FIGS. 8A-8C, a solid line S represents a sagittal image surface, and a dotted line M represents a tangential image surface.

In the zoom lens in the fourth embodiment, as shown in FIGS. 8A to 8C, sufficient optical characteristics were achieved in terms of the spherical aberration, the astigmatism and the distortion aberration at the wide-angle end, the intermediate focal length and the telephoto end. Therefore, the zoom lens which is compact, large in zoom ratio and is high performance can be achieved with simple structure, and therefore, the small-size and slim zoom lens suitable for portable devices such as mobile phones and PDAs can be implemented.

Although concrete numerical examples were shown in Table 1 to Table 12 in the first to the fourth embodiments, the zoom lens in the present invention is not limited to the embodiments disclosed, but the refracting power and the aberration of the first lens group to the fourth lens group should appropriately be set so that sufficient optical characteristics (characteristics such as spherical aberration, astigmatism and distortion aberration) can be obtained at the wide-angle end, the intermediate focal length and the telephoto end.

As shown in the first to the fourth embodiments, the zoom lens in the present invention makes it possible to make the thickness of an entire camera module extremely small by combining the zoom lens with electronic imaging devices. Therefore, the zoom lens can easily be mounted on portable information devices such as digital cameras, mobile phones and PDAs (Personal Digital Assistants).

The zoom lens in the present invention is applicable to small-size photographing devices suitable for the portable use.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A zoom lens, consisting essentially of:
   a first lens group which has a fixed distance from an image plane and which has negative refracting power;
   a second lens group which has positive refracting power and which moves at a time of zooming;

a third lens group which has positive refracting power and which moves at a time of zooming; and a fourth lens group which has a fixed distance from the image plane and which has positive refracting power;

wherein the first lens group, the second lens group, the third lens group and the fourth lens group are arranged in order from an object side to an image plane side, wherein the third lens group has an aperture stop and a plurality of lenses, wherein a plurality of the lenses in the third lens group include at least one lens having positive refracting power and at least one lens having negative refracting power, and wherein in the third lens group, the aperture stop, the lens having the positive refracting power and the lens having the negative refracting power are arranged in order from the object side to the image plane side.

2. A digital camera, comprising
the zoom lens according to claim 1, and
an electronic imaging device for receiving images formed by the zoom lens.

3. A portable information device, comprising
the zoom lens according to claim 1, and
an electronic imaging device for receiving images formed by the zoom lens.

4. A zoom lens, consisting essentially of:
a first lens group which has a fixed distance from an image plane and which has negative refracting power;
a second lens group which has positive refracting power and which moves at a time of zooming;
a third lens group which has positive refracting power and which moves at a time of zooming; and
a fourth lens group which has a fixed distance from the image plane and which has positive refracting power;
wherein the first lens group, the second lens group, the third lens group and the fourth lens group are arranged in order from an object side to an image plane side,
wherein the third lens group has an aperture stop and a plurality of lenses, and
wherein at a time of zooming from a wide-angle end to a telephoto end, an interval between the first lens group and the second lens group decreases monotonously, while an interval between the third lens group and the fourth lens group increases monotonously.

5. The zoom lens according to claim 4,
wherein a plurality of the lenses in the third lens group include at least one lens having positive refracting power and at least one lens having negative refracting power.

6. The zoom lens according to claim 5,
wherein in the third lens group, the aperture stop, the lens having the positive refracting power and the lens having the negative refracting power are arranged in order from the object side to the image plane side.

7. A zoom lens, consisting essentially of:
a first lens group which has a fixed distance from an image plane and which has negative refracting power;
a second lens group which has positive refracting power and which moves at a time of zooming;
a third lens group which has positive refracting power and which moves at a time of zooming; and
a fourth lens group which has a fixed distance from the image plane and which has positive refracting power;
wherein the first lens group, the second lens group, the third lens group and the fourth lens group are arranged in order from an object side to an image plane side,
wherein the third lens group has an aperture stop and a plurality of lenses,
wherein at a time of zooming from a wide-angle end to a telephoto end, an interval between the third lens group and the fourth lens group increases, and
wherein at a time of zooming from a position at which an interval between the first lens group and the second lens group is minimized to a telephoto end, an amount of change in the interval between the first lens group and the second lens group is $1/10$ or less of a maximum travel amount of the second lens group.

8. The zoom lens according to claim 7,
wherein a plurality of the lenses in the third lens group include at least one lens having positive refracting power and at least one lens having negative refracting power.

9. The zoom lens according to claim 8,
wherein in the third lens group, the aperture stop, the lens having the positive refracting power and the lens having the negative refracting power are arranged in order from the object side to the image plane side.

10. The zoom lens according to any one of claims 1 to 9,
comprising a mechanical shutter placed in between the third lens group and the fourth lens group in a vicinity of the third lens group.

11. The zoom lens according to any one of claims 1 to 9,
wherein the first lens group is structured from only one lens.

12. The zoom lens according to claim 11,
wherein the first lens group is a meniscus lens having a convex surface on the object side.

13. The zoom lens according to claim 12,
wherein a concave surface of the meniscus lens on the image plane side is aspheric.

14. The zoom lens according to claim 13,
wherein in the first lens group, the concave surface of the meniscus lens on the image plane side is formed to be aspherical with resin.

* * * * *